United States Patent
Dohi et al.

(10) Patent No.: US 6,560,103 B1
(45) Date of Patent: May 6, 2003

(54) ACCESSORY OF ELECTRONIC DEVICE

(75) Inventors: Hidemi Dohi, Tottori (JP); Shoichi Sunagawa, Tottori (JP); Toshio Ikeuchi, Iwami-gun (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 0 days.

(21) Appl. No.: 09/787,418

(22) PCT Filed: Mar. 25, 1999

(86) PCT No.: PCT/JP99/01555

§ 371 (c)(1),
(2), (4) Date: Mar. 22, 2001

(87) PCT Pub. No.: WO00/17733

PCT Pub. Date: Mar. 30, 2000

(30) Foreign Application Priority Data

| Sep. 22, 1998 | (JP) | ............................................. | 10-267934 |
| Sep. 29, 1998 | (JP) | ............................................. | 10-275542 |
| Sep. 29, 1998 | (JP) | ............................................. | 10-275877 |
| Sep. 30, 1998 | (JP) | ............................................. | 10-277992 |

(51) Int. Cl.[7] ................................................. G06F 1/16
(52) U.S. Cl. ........................ 361/686; 361/683; 710/303; 710/304
(58) Field of Search ................................ 361/683–686, 361/724–727; 395/186, 188.01, 43.12–43.22; 710/303, 304

(56) References Cited

U.S. PATENT DOCUMENTS

| 5,619,398 A | * | 4/1997 | Harrison et al. | ............ 361/686 |
| 5,687,592 A | * | 11/1997 | Penniman et al. | ........... 361/683 |
| 5,737,541 A | * | 4/1998 | Shimizu et al. | .............. 710/303 |
| 5,805,412 A | * | 9/1998 | Yanagisawa et al. | ....... 361/686 |
| 5,870,283 A | * | 2/1999 | Maeda et al. | ................. 361/686 |
| 5,928,017 A | * | 7/1999 | Lan | .............................. 361/686 |
| 5,948,074 A | * | 9/1999 | Ninomiya | .................... 361/683 |
| 6,115,244 A | * | 9/2000 | Chen et al. | ................... 361/684 |
| 6,236,571 B1 | * | 5/2001 | Dohi et al. | ................... 361/727 |

FOREIGN PATENT DOCUMENTS

| JP | 7-84689 | 3/1995 |
| JP | 9-114554 | 5/1997 |
| JP | 10-133778 | 5/1998 |
| JP | 10-171552 | 6/1998 |
| WO | WO97/31307 | 8/1997 |

* cited by examiner

*Primary Examiner*—Darren Schuberg
*Assistant Examiner*—Lisa Lea-Edmonds
(74) *Attorney, Agent, or Firm*—Arent Fox Kintner Plotkin & Kahn, PLLC

(57) ABSTRACT

When an electronic device (e.g., a notebook personal computer) (5) is mounted on an accessory (1), functions of the electronic device (5) are added. To detach the electronic device 85) from the accessory (1), operation levers (37) provided at the rear portions of both sides of the accessory (1) are operated. Since any force necessary to detach the electronic device (5) is not applied until the operation levers (37) are opened to a predetermined angle, the operability of the operation levers (37) does not deteriorate even if the operation levers (37) are so designed as not to project from the accessory (1) in view of the appearance of the accessory (1). To prevent the electronic device from being stolen, a control plate provided in the accessory (1) is set in a predetermined position, and a key (10) is inserted into a lock part (9) fitted to the accessory (1) and rotated so as not to allow the operation levers (37) to be opened.

13 Claims, 17 Drawing Sheets

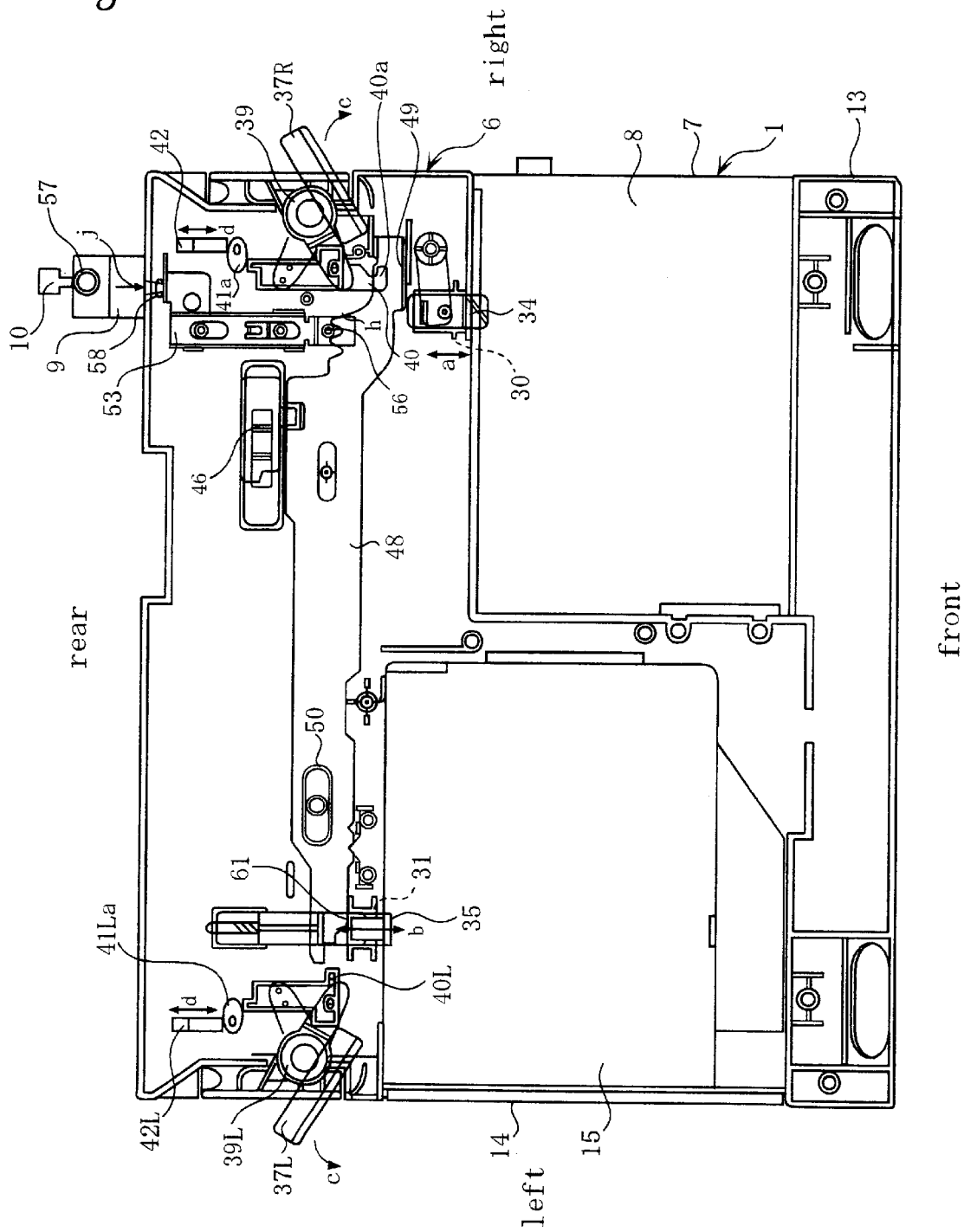

ACCESSORY OF ELECTRONIC DEVICE

TECHNICAL FIELD

The present invention relates to an accessory for expanding the function of an electronic device.

BACKGROUND ART

JP-A-9-265333 discloses that an accessory is placed on an expansion device, and an electronic device is placed on the accessory. The expansion device houses mechanical equipment for expanding the function of the electronic device (a CD-ROM, etc.), and a PCMCIA (Personal Computer Memory Card International Association) card or the like can be inserted into the accessory.

The accessory is provided with a locking part. When locking is performed, a hook in the accessory engages the electronic device, and a shutter in the accessory closes an insertion port of the card. The locking is thus performed, to prevent the electronic device and the card (mechanical equipment) from being stolen.

In the conventional device, however, the hook is driven in synchronization with the locking part. When the electronic device and the card are detached from the accessory, therefore, a key must be inserted into the locking part each time to perform unlocking. The conventional device is not convenient to use. Further, a structure for transmitting a turning force or a spring force of the key inserted into the locking part to the hook or the shutter by a rotating member, a slide plate, or the like is complicated.

In order to eject the electronic device, the key is inserted into the locking part and is turned through a predetermined angle to release the engagement with the electronic device, and the key is further turned to eject the electronic device. Since an operation for turning the key must be thus performed twice, an ejecting operation is complicated. A special locking part capable of performing a predetermined operation by such a turning operation performed twice is required. Further, in the conventional accessory, it is not easy to connect a connector provided in the electronic device and a connector provided in the accessory to each other.

DISCLOSURE OF INVENTION

An accessory of an electronic device according to the present invention comprises a base on which the electronic device is placed, a hook provided in the base so as to be movable between an engaging position where the electronic device is to be engaged and a releasing position where the engagement is to be released, and an operation lever provided in the base in order to operate the hook, and is so constructed that the hook is maintained at the engaging position during an initial state where the operation lever is opened to a predetermined angle from its closed state.

The operation lever is used for releasing the engagement of the electronic device. Compared with such construction that the engagement is released by an operation for turning a key, the lever is more convenient to use than the key. Further, special locking means may not be used. During the initial state where the operation lever is opened to a predetermined angle from the closed state, the hook is maintained at the engaged position. Accordingly, a force for moving the hook to the releasing position is not added to the operation lever. Consequently, a user can operate the operation lever by a small force in the initial state.

Even if the operation lever is provided so as not to project from the base, and a recess for a user catching his or her finger on the operation lever (formed in the base) is formed in small size, a force for opening the operation lever may be small in the initial state. Accordingly, the user can easily open the operation lever to a predetermined angle by the tip of the finger. After the operation lever is opened to a predetermined angle, the user can exert a large force on the operation lever by sufficiently catching the finger on the operation lever. Accordingly, it is possible to easily fully open the operation lever to release the engagement of the electronic device by the hook.

The accessory of the electronic device according to the present invention comprises a driving mechanism for transmitting to the hook a force produced by operating the operation lever, and is so constructed that the driving mechanism is maintained in its stationary state (unmoved state) during the initial state.

Consequently, in the initial state where the operation lever is opened to a predetermined angle from the closed state, the hook can be maintained at the engaging position.

The accessory of the electronic device according to the present invention is constructed by providing a predetermined clearance between the operation lever and the driving mechanism.

Consequently, during the initial state where the operation lever is opened to a predetermined angle from the closed state, it is possible to maintain the driving mechanism in the stationary state (unmoved state).

The accessory of the electronic device according to the present invention is constructed by composing the driving mechanism of a plurality of members, and providing a predetermined clearance between at least the one pair of members.

Consequently, during the initial state where the operation lever is opened to a predetermined angle from the closed state, it is possible to maintain the whole of the driving mechanism in the stationary state (unmoved state).

The accessory of the electronic device according to the present invention is so constructed that an ejecting part for ejecting the electronic device by operating the operation lever is provided in the base, and the ejecting part is not ejected during the initial state.

Consequently, during the initial state, it is possible to prevent the weight of the electronic device from being produced as a force against the operation of the operation lever. Consequently, it is possible for the user to operate the operation lever by a small force in the initial state.

The accessory of the electronic device according to the present invention is so constructed that an outer surface of the operation lever is approximately flush with an outer surface of the base when the operation lever is in its closed state.

Consequently, in the closed state, the operation lever does not project from the base, thereby making it possible to prevent an operation force from being exerted on the operation lever by user's carelessness, for example. Further, it is possible to prevent the operation lever from being damaged, for example. The appearance of the accessory is improved, as compared with a shape in which the operation lever projects from the base.

An accessory of an electronic device according to the present invention comprises a base having a mounting part on which the electronic device is placed and a housing part housing a member, a hook provided in the base so as to be movable between an engaging position where the electronic device is to be engaged and a releasing position where the engagement is to be released, an operation lever provided in the base in order to operate the hook, an engaging part provided in the base so as to be movable between an engaging position where a member housed in the housing part is to be engaged and a releasing position where the engagement is to be released, an operating part provided in the base in order to operate the engaging part, and a locking part provided so as to be attachable and detachable to and from the base, and is so constructed that the locking part cannot be detached from the base when the locking part is attached to the base to achieve locking, the movement of the hook to the releasing position is limited, and the movement of the engaging part to the releasing position is limited.

The operation lever is used for releasing the engagement of the electronic device, and the operating part is used for releasing the engagement of the member housed in the housing part. Compared with a shape in which the engagement of the electronic device and the engagement of the member are simultaneously released by an operation for turning a key, the lever is more convenient to use than the key. Further, special locking means may not be used. When the locking part is attached to the base to achieve locking, the locking part cannot be detached from the base. Accordingly, the movement of the hook to the releasing position is limited, and the movement of the engaging part to the releasing position is limited. Accordingly, it is possible to prevent the electronic device and the member from being detached from the accessory and stolen. Further, if the locking part and a desk or the like are connected to each other by a chain or the like, it is also possible to prevent the accessory from being stolen.

The accessory of the electronic device according to the present invention comprises a control plate provided in the base so as to be movable to a plurality of positions, and a movement operating part for operating the movement of the control plate, and is so constructed that when the locking part is attached to the base to achieve locking in a state where the control plate is positioned at a first position, the locking part cannot be detached from the base, so that the movement of the hook to the releasing position is limited, the movement of the engaging part to the releasing position is limited, and the movement of the control plate from the first position to another position is limited.

If the control plate is set at the first position to perform the locking, it is possible to prevent the electronic device and the member from being detached from the accessory and stolen. In order to obtain the locked state of the electronic device and the member, the first position of the control plate may be maintained by the locking operation of the locking part, thereby making it possible to simplify the construction.

The accessory of the electronic device according to the present invention comprises a control plate provided in the base so as to be movable to a plurality of positions, and a movement operating part for operating the movement of the control plate, and is so constructed that when the locking part is attached to the base to achieve locking in a state where the control plate is positioned at a second position, the locking part cannot be detached from the base, so that the movement of the hook to the releasing position is allowed, the movement of the engaging part to the releasing position is allowed, and the movement of the control plate from the second position to another position is limited.

Even if the locking is performed by the locking part, therefore, the electronic device and the member are freely detached and attached. On the other hand, if the locking part and a desk or the like are connected to each other by a chain or the like, it is possible to prevent the accessory from being stolen.

The accessory of the electronic device according to the present invention comprises a control plate provided in the base so as to be movable to a plurality of positions, and a movement operating part for operating the movement of the control plate, and is so constructed that when the locking part is attached to the base to achieve locking in a state where the control plate is positioned at a third position, the locking part cannot be detached from the base, so that the movement of the hook to the releasing position is allowed, the movement of the engaging part to the releasing position is limited, and the movement of the control plate from the third position to another position is limited.

If the control plate is set at the third position to perform the locking, it is possible to freely attach and detach the electronic device to and from the accessory. Even when the user leaves his or her seat upon detaching the electronic device from the accessory, it is possible to prevent the member from being taken out and stolen. Further, if the locking part and a desk or the like are connected to each other by a chain or the like, it is possible to prevent the accessory from being stolen.

The accessory of the electronic device according to the present invention is constructed by providing the moving operating part on a reverse surface of the base. Consequently, it is impossible for a third person other than the user to know which of the first position, the second position, and the third position is the position of the control plate.

The accessory of the electronic device according to the present invention is so constructed that an ejecting part for ejecting the electronic device is provided in the base, and the engagement of the electronic device by the hook is released, and the ejecting part ejects the electronic device when the operation lever is operated.

It is possible to simultaneously release the engagement of the electronic device and the ejection thereof only by operating the operation lever. Accordingly, the ejecting operation is simplified.

An accessory of an electronic device according to the present invention comprises a base having a mounting part on which the electronic device is placed, a base part arranged below the mounting part, and a housing part housing a member, and is so constructed that either one of a function expanding member for the electronic device and a driving battery for the electronic device is arbitrarily housed as the member in the housing part.

Consequently, a space for the housing part may be smaller, as compared with that in such construction that both the function expanding member and the driving battery are simultaneously housed, thereby making it possible to miniaturize the accessory. Further, when the containment of the function expanding member is selected, an operation for expanding the function of the electronic device can be performed. On the other hand, when the containment of the driving battery is selected, it is possible to ensure a standby battery for the electronic device. Further, the accessory is more convenient for use, as compared with that in a case where it only has a dedicated housing part housing only one of the function expanding member and the driving battery.

The accessory of the electronic device according to the present invention is so constructed that the housing part has in a cross shape a housing space interposed between the base part and the mounting part and a housing space by the difference between steps formed in the mounting part, and one of the function expanding member for the electronic device and the driving battery for the electronic device is arbitrarily housed in either one of the housing spaces.

When the housing spaces which cross each other are realized by only the shape of the base member or the shape of the mounting part, the shape of the base member or the shape of the mounting part becomes complicated. By the above-mentioned construction, however, the complication of the shape can be reduced. Further, the housing space corresponding to the function expanding member and the housing space corresponding to the driving battery can be respectively formed most suitably, thereby making it possible to prevent backlash or the like at the time of the containment.

The accessory of the electronic device according to the present invention is constructed by providing a charging part for charging the contained driving battery.

Consequently, it is possible to not only contain (ensure) the standby battery but also charge the standby battery. At the time of replacing batteries, it is possible to load a fully charged battery in the electronic device.

An accessory of an electronic device according to the present invention comprises a base having a mounting part on which the electronic device is placed, a first housing part housing a first member, and a second housing part housing a second member, and a switching operating part provided in the base, and is so constructed that the first member or the second member is ejected in response to an operation of the switching operating part.

Consequently, the two members can be ejected by the one switching operating part, thereby making it possible to reduce the number of parts to reduce the cost.

The accessory of the electronic device according to the present invention is so constructed that a lever having its one end pivoted and having the other end fixed to the switching operating part is provided in the base so as to be positioned between the first housing part and the second housing part, the first member which is abutted against the lever is ejected from the first housing part when the lever is rotated in a first direction by operating the switching operating part, and a second member which is abutted against the lever is ejected from the second housing part when the lever is rotated in a second direction.

When the switching operating part merely slides to eject the members, the switching operating part may, in some cases, be suitable for the ejection of the first member but unsuitable for the ejection of the second member depending on the place where it is provided. As described above, in the case of the ejection by the lever, it is easy to form a predetermined part of the lever so as to be suitable for the ejection of the first member and form the other part thereof so as to be suitable for the ejection of the second member, and the degree of freedom of the position where the switching operating part is arranged is increased.

An accessory of an electronic device according to the present invention comprises a base having a mounting part on which the electronic device is placed and a housing part housing a member, a first projection and a second projection which are provided in the base so as to be respectively inserted into a first hole and a second hole which are formed in the electronic device, and a second connecting terminal provided in the base so as to be inserted into a first connecting terminal provided in the electronic device.

Consequently, the positioning between the electronic device and the base is obtained by the fitting between the first hole and the first projection and the fitting between the second hole and the second projection, thereby making it possible to accurately connect the first connecting terminal to the second connecting terminal.

The accessory of the electronic device according to the present invention is constructed by almost perpendicularly providing both the first projection and the second connecting terminal, and almost horizontally providing the second projection.

Preliminary positioning is obtained by engaging the second projection with the second hole. Hinge-like connection occurs by the engagement, it is easy to fit the second hole in the first projection by rotating the electronic device using the connecting portion as a fulcrum, and the positioning can be simply obtained by the fitting.

The accessory of the electronic device according to the present invention is constructed by providing a first conductive part on a reverse surface of the second projection, to provide electrical grounding between a first circuit board provided in the electronic device and a second circuit board provided in the base through the first conductive part.

The grounding area is increased by the electrical grounding, thereby making it possible to prevent noises from being produced, for example.

The accessory of the electronic device according to the present invention is so constructed that a second flexible conductive part having its one end electrically connected to the first circuit board in the electronic device and the other end arranged so as to face the second hole is interposed between the first conductive part and an edge of the second hole when the electronic device is attached to the mounting part.

Consequently, it is possible to reliably prevent the first conductive part and the second conductive part from being brought into a non-contact state.

BRIEF DESCRIPTION OF DRAWINGS

FIG. 13 is a diagram schematically showing an internal structure of an accessory and a plan view of a state where a control plate is placed at a third position and is locked.

BEST MODE FOR CARRYING OUT THE INVENTION (Schematic Description)

Figure 1:
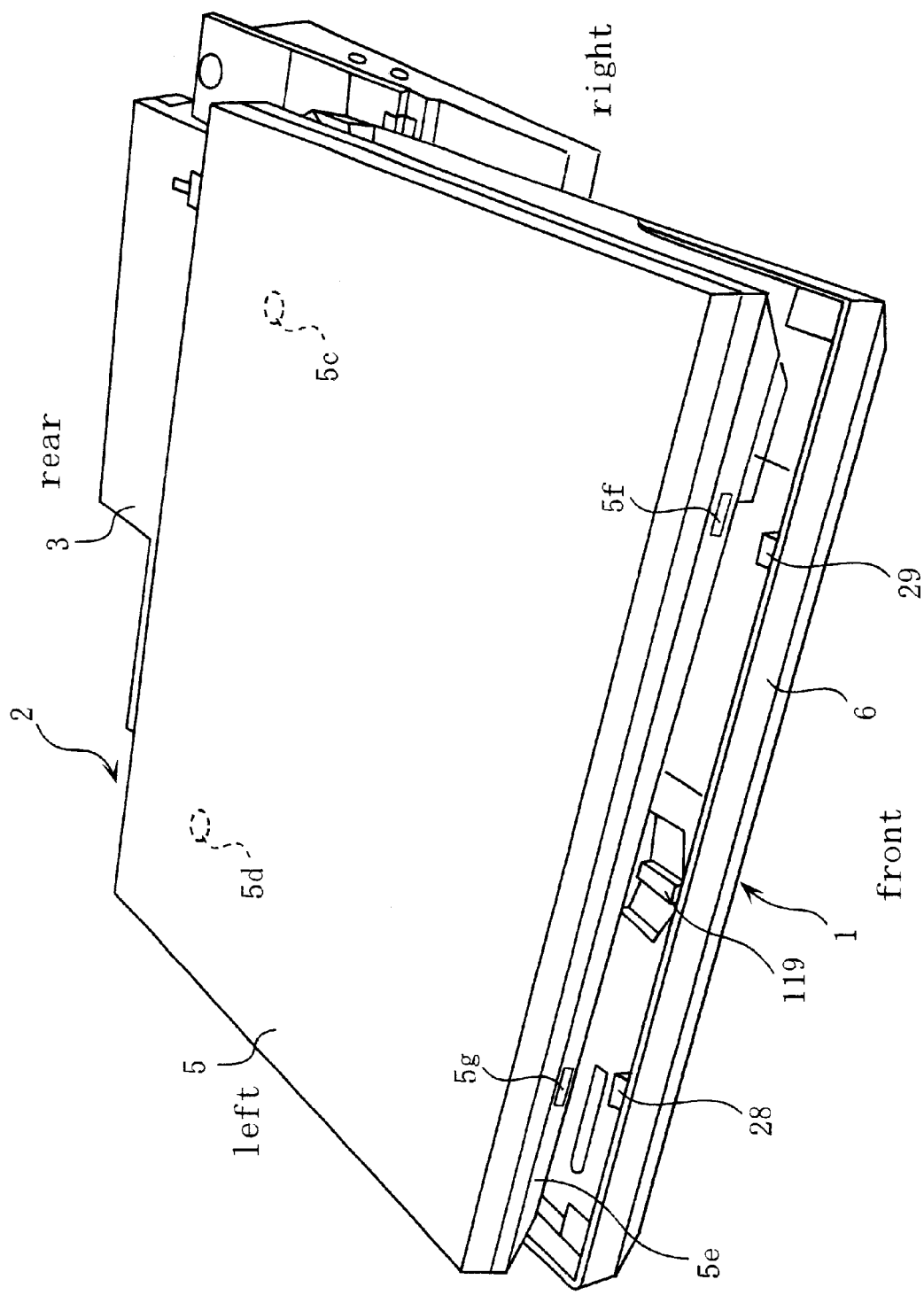
FIG. 1 is a perspective view of a state where an accessory is set in a function expanding device, and an attempt to place an electronic device on the accessory is made.
Figure 2:
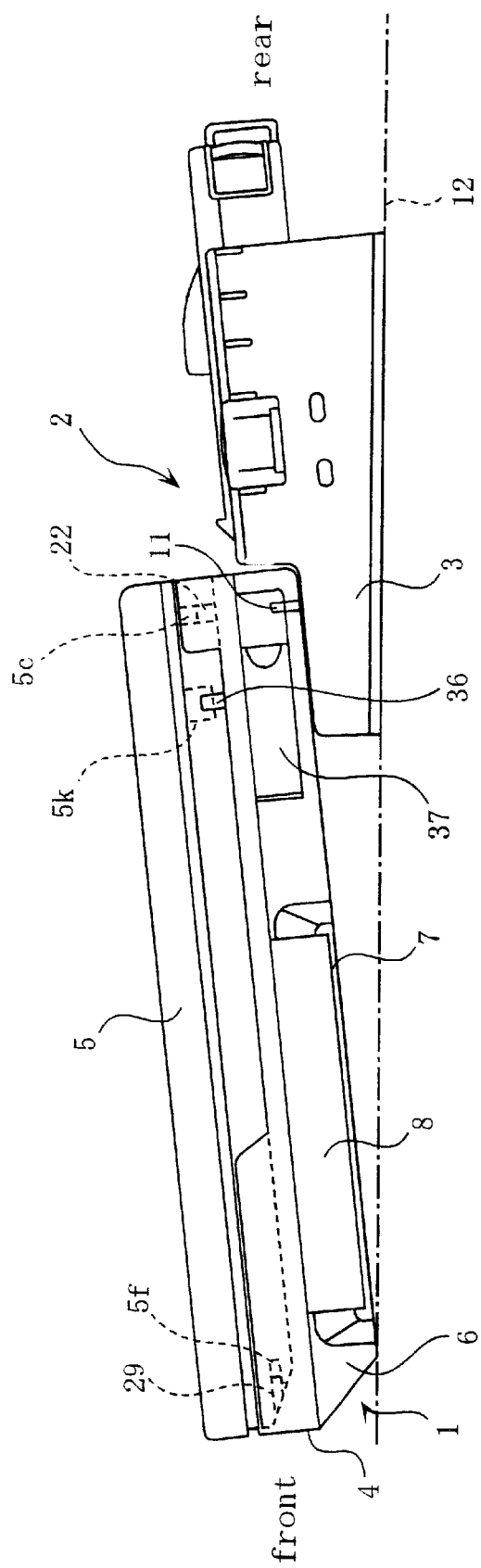
FIG. 2 is a side view of a state where an accessory is set in a function expanding device, and an electronic device is placed on the accessory.

An accessory of an electronic device according to the present embodiment will be schematically described on the basis of FIGS. 1 and 2. An electronic device 5 is a notebook personal computer. The electronic device 5 is carried on a base 6 of an accessory 1. An opening 7 is formed on a right side surface of the base 6. Mechanical equipment 8 for expanding the function of the electronic device 5 (for example, a floppy disk driver) can be housed in the base 6 from the opening 7. An opening 14 is formed on a left side surface of the base 6, which is not illustrated in FIGS. 1 and 2. Mechanical equipment 15 (for example, a CD-ROM driver) can be housed in the base 6 from the opening 14 (see FIG. 6). A locking part 9 is fixed to the rear of the base 6. A key 10 is inserted into the locking part 9.

A PCMCIA card or the like is inserted into a function expanding device 3, and a USB (Universal Serial Bus) terminal and a LAN (Local Area Network) connecting terminal are provided in suitable places. A projection 11 is formed on an upper surface at the front of the function expanding device 3. The projection 11 is inserted into a hole formed on a bottom surface of the base 6, thereby making it possible to couple the function expanding device 3 and the accessory 1. The accessory 1 is placed with its bottom surface at the front thereof brought into contact with a desk 12, for example.

The mechanical equipment for expanding the function of the electronic device 5 is housed, as described above, in the accessory 1 and the function expanding device 3. The electronic device 5, the accessory 1, and the function expanding device 3 are coupled, to construct an expanding system 2. Only a combination of the accessory 1 and the electronic device 5 can sufficiently function as a system. Further, when the electronic device 5 is detached from the accessory 1, the electronic device 5 can be independently used, so that it is easy to carry.

(Description of electronic device 5)

The electronic device 5 will be described on the basis of FIGS. 1 to 3. The electronic device 5 comprises a display part 5a and a main body 5b. The display part 5a is constituted by a liquid crystal display device, for example, and is provided such that it can be opened or closed by a hinge (not shown) provided at the rear of the main body 5b.

The main body 5b is composed of plastic, for example, and is formed in an approximately box shape. A keyboard or the like is provided on a surface of the main body 5b. An electric part such as a CPU is arranged in the main body 5b. First holes 5c and 5d are formed at predetermined positions on a bottom surface at the rear of the main body 5b. The first holes 5c and 5d are formed so as to be approximately perpendicular to the bottom surface of the main body 5b. Since the bottom surface of the main body 5b is placed on a mounting part 4 in the accessory 1, the first holes 5c and 5d are also approximately perpendicular to the mounting part 4.

An upward inclined surface 5e is formed at the front of the main body 5b. Second holes 5f and 5g are formed almost level with (parallel to) the mounting part 4 at predetermined positions of the upward inclined surface 5e.

A predetermined interconnection pattern is formed in a first circuit board 5i, and a CPU and various- types of electric parts, for example, are carried on the interconnection pattern. The first circuit board 5i is engaged with a boss 5h provided at the bottom of the main body 5b. A second conductive part 5j is composed of a flexible material (for example, phosphor bronze), and has its one end electrically connected to a grounding pattern on the first circuit board 5i. A hook-shaped portion formed at the other end of the second conductive part 5j faces the second hole 5f. Since the second conductive part 5j has flexibility, the other end (the hook-shaped portion) can be moved in an A direction if it receives an external force, and is returned to its original position when the external force is eliminated.

A recess (not shown) is formed at a predetermined position at the bottom of the main body 5b, and a first connecting terminal 5k is arranged in the recess. The first connecting terminal 5k is a male connector composed of 50 to 100 pins, for example. The first connecting terminal 5k is formed almost perpendicularly to the bottom surface of the main body 5b. Since a bottom surface of the main body 5b is placed in the mounting part 4 in the accessory 1, the first connecting terminal 5k is also approximately perpendicular to the mounting part 4.

(Relationship between accessory 1 and electronic device 5)

Figure 4:
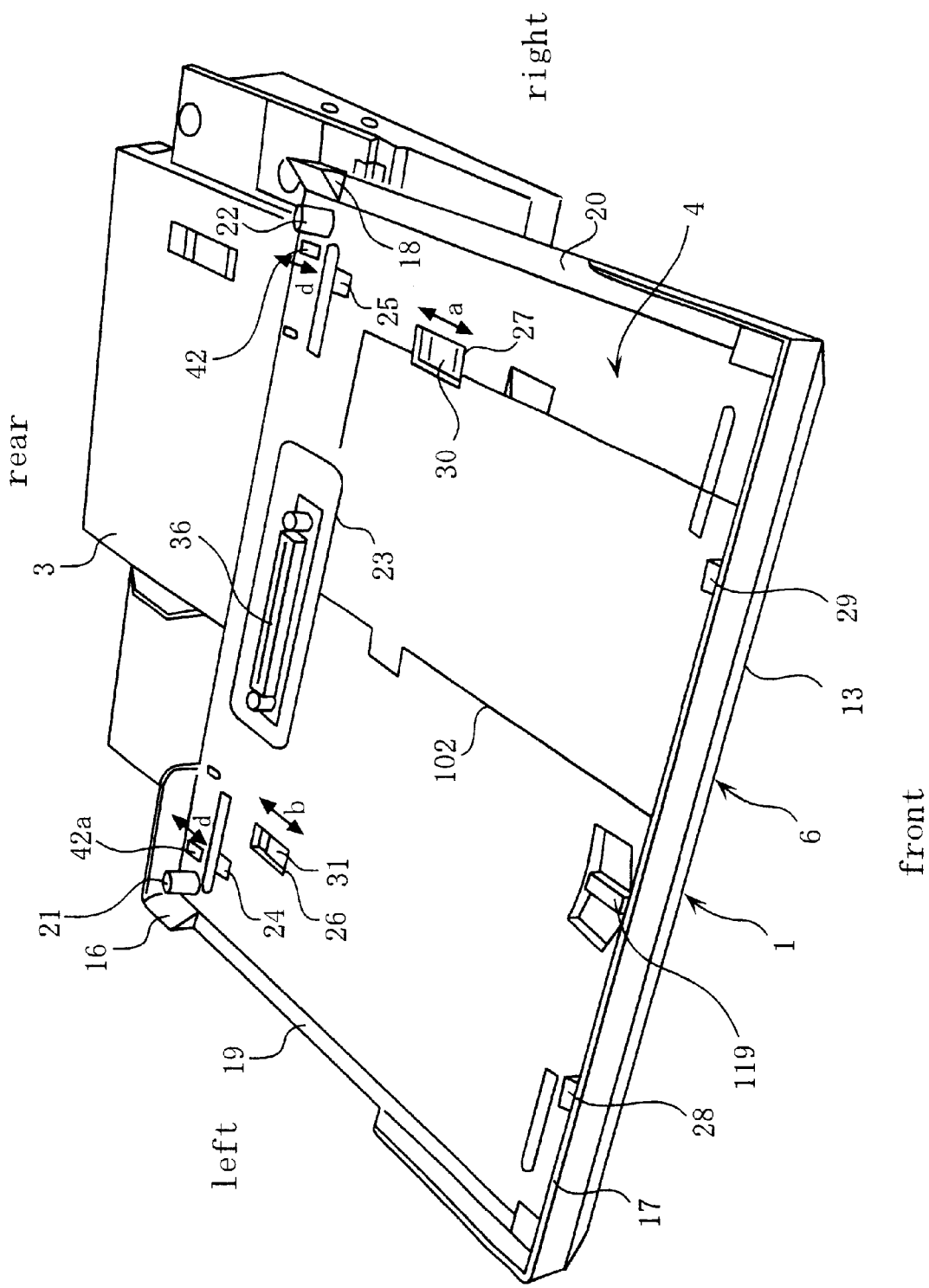
FIG. 4 is a perspective view of an accessory set in a function expanding device.
Figure 5:
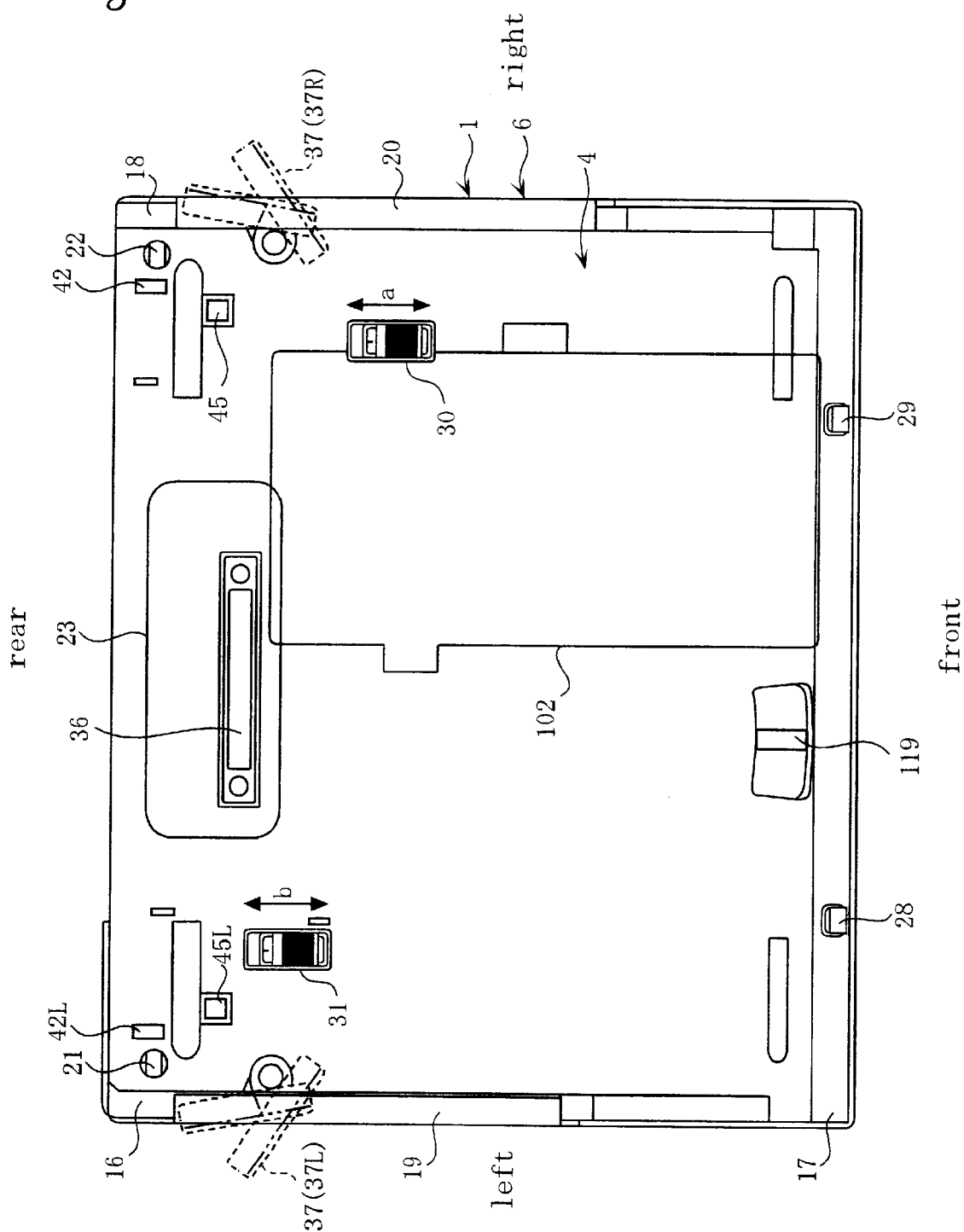
FIG. 5 is a plan view of an accessory.
Figure 6:
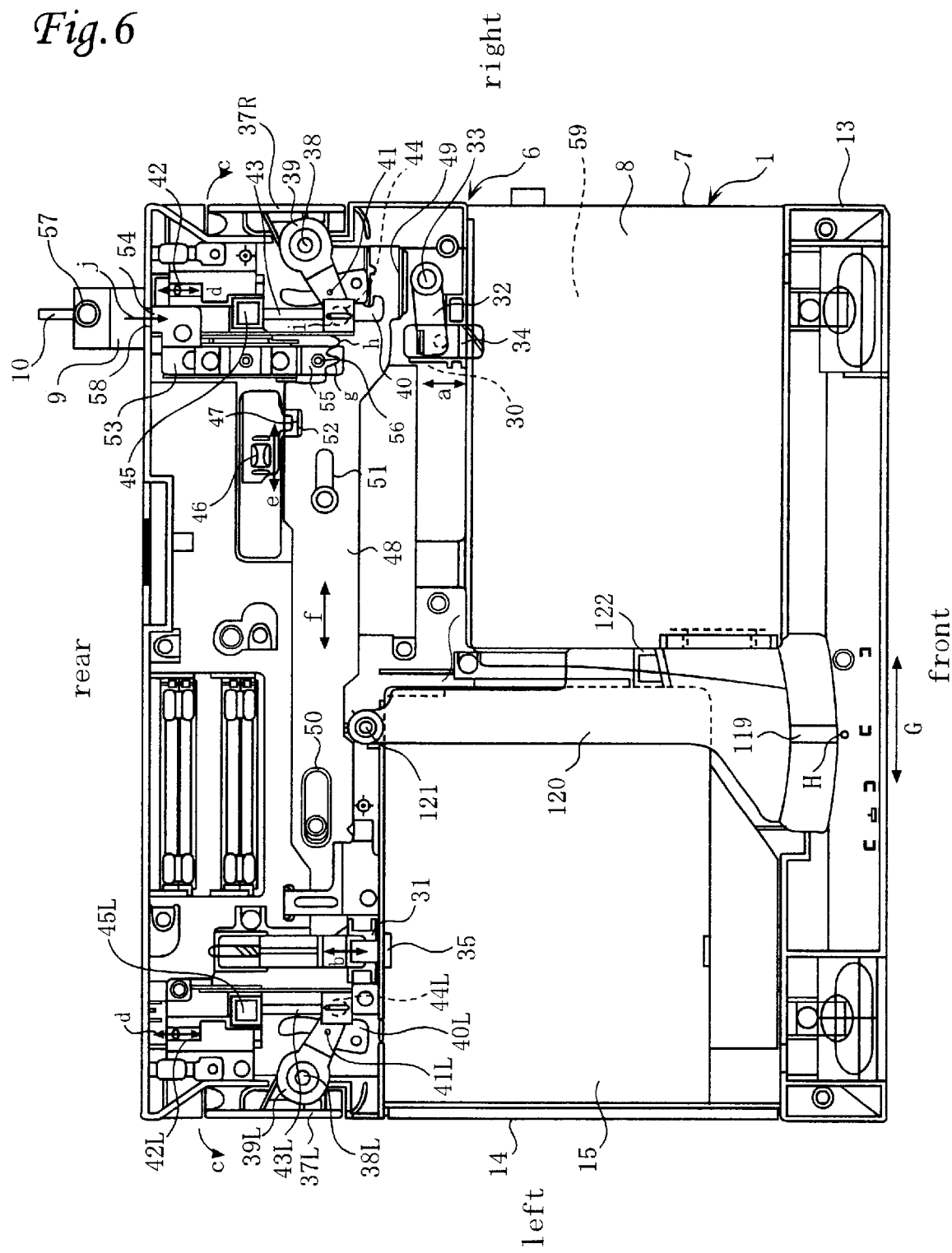
FIG. 6 is a plan view showing an internal structure (an unlocked state) of an accessory.
Figure 7:
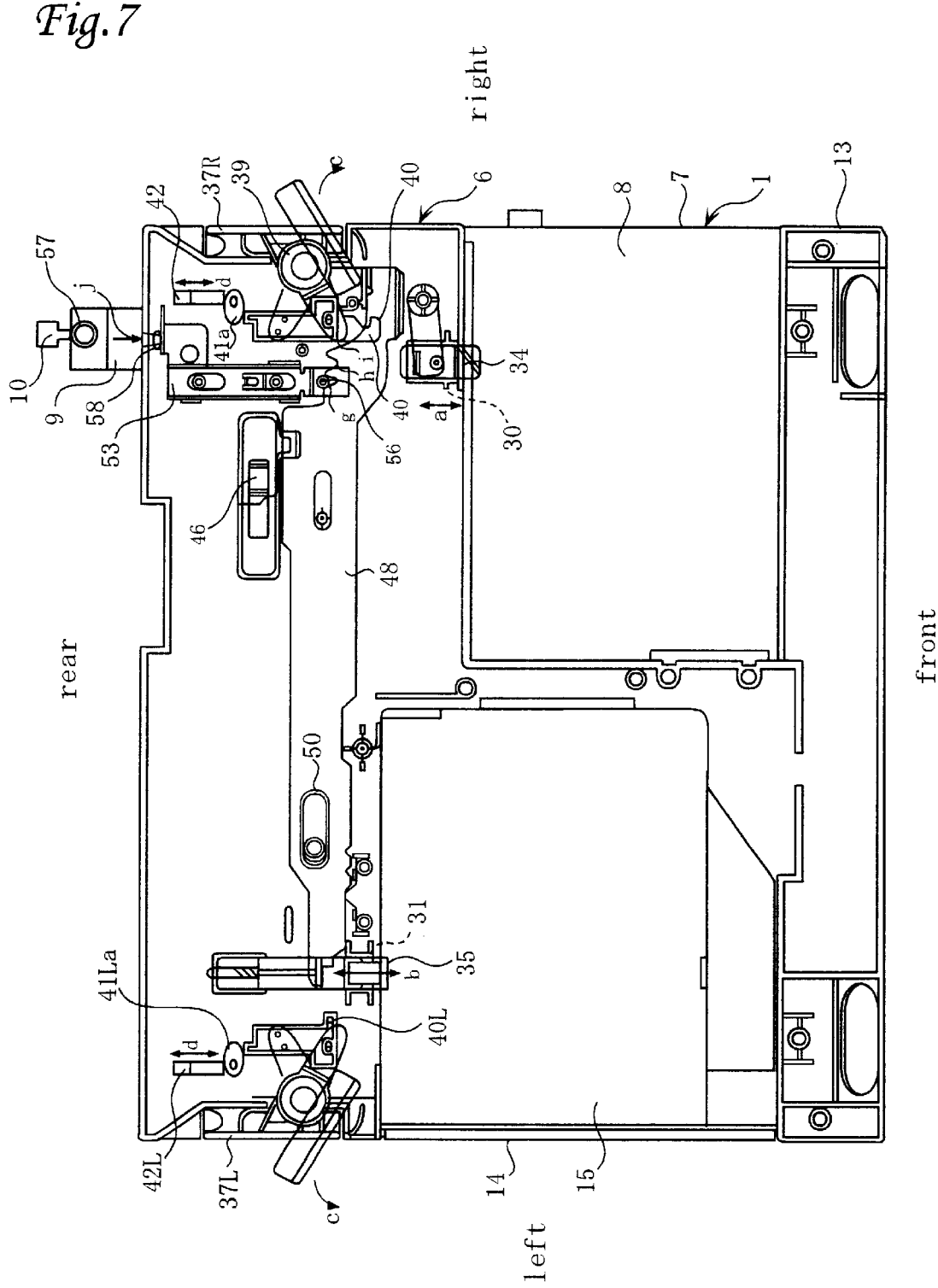
FIG. 7 is a diagram schematically showing an internal structure of an accessory and a plan view of a state where a control plate is put at a second position and is locked.

As also shown in FIGS. 4 to 6, the base 6 constituting the accessory 1 mainly comprises a base part 13 and the mounting part 4. The base part 13 is composed of plastic, for example, and is formed in the shape of a recess opened upward. The opening 7 is formed on a right side surface of the base part 13, and the mechanical equipment 8 can be housed in the base 6 through the opening 7. Further, the opening 14 is formed on a left side surface of the base part 13, and the mechanical equipment 15 can be housed in the base 6 through the opening 14.

The mounting part 4 is composed of plastic, for example, side guide parts 16 and 18 higher than its center are formed at both its side edges, and a front guide part 17 is formed at its front edge. The bottom surface of the main body 5b of the electronic device 5 is abutted against mounting surfaces 19 and 20 formed at both the side edges of the mounting part 4. First projections 21 and 22 projecting in the vertical direction are formed on an upper surface at the rear of the mounting part 4, and second projections 28 and 29 projecting in the horizontal direction are formed in the front guide part 17. Further, openings 23, 24, 25, 26, 27, etc. are formed at predetermined positions of the mounting part 4. The mounting part 4 is provided on the base part 13, and is fixed to the base part 13 by a small screw (not shown) inserted into a predetermined position.

When the electronic device 5 is set in the accessory 1, the first projections 21 and 22 which are approximately perpendicular to the mounting part 4 are respectively fitted in the first holes 5d and 5c in the main body 5b of the electronic device 5, and the second projections 28 and 29 which are approximately level with the mounting part 4 are respectively fitted in the second holes 5f and 5g formed on the upward inclined surface 5e of the main body 5b.

Figure 3:
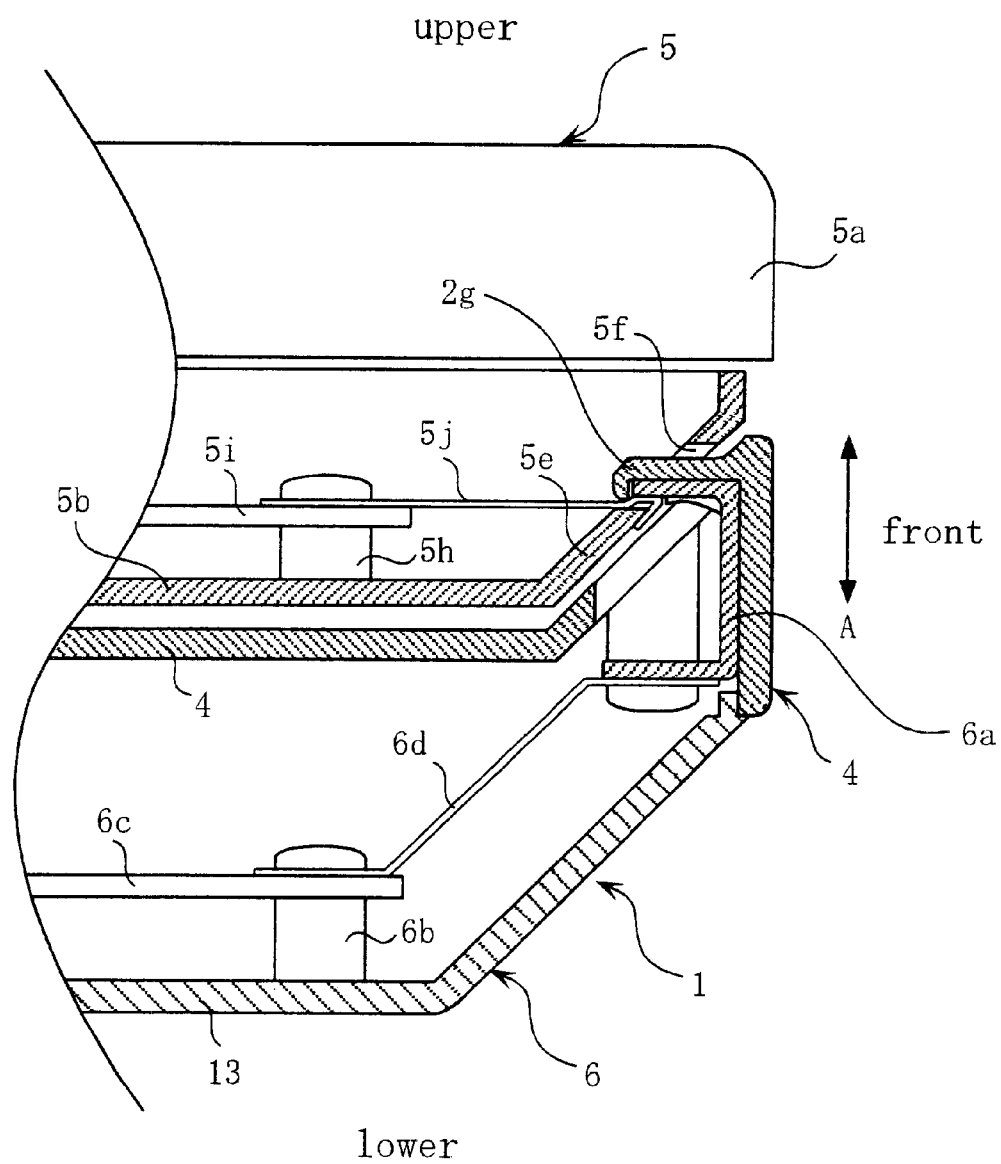
FIG. 3 is a cross-sectional view showing a front portion in a state where an electronic device is placed on an accessory.

The first conductive part 6a shown in FIG. 3 is composed of a metal plate having high conductivity, for example, and is formed in an approximately □ shape along an inner surface of the second projection 29.

A predetermined interconnection pattern is formed in a second circuit board 6c, and various types of electric parts are carried on the pattern. The second circuit board 6c is engaged with a boss 6b provided at the bottom of the base part 13. An end of a third conductive part 6d is electrically connected to a grounding pattern on the second circuit board 6c, and the other end thereof is electrically connected to a first conductive part 6a.

When the electronic device 5 is set in the accessory 1, the other end of the second conductive part 5j is electrically connected to the first conductive part 6a, so that the first circuit board 5i in the electronic device 5 and the second circuit board 6c in the base 6 (the accessory 1) are grounded. Further, the second conductive part 5j is interposed between the first conductive part 6a and an edge of the second hole 5f, thereby making it possible to reliably prevent the first conductive part 6a and the second conductive part 5j from being brought into a non-contact state.

The base part 13 in the base 6 is provided with a second connecting terminal (for example, a male connector) 36, as shown in FIG. 4. The second connecting terminal 36 projects almost perpendicularly to a surface of the mounting part 4 from the opening 23 formed in the mounting part 4.

When the electric device 5 is set in the accessory 1, as shown in FIG. 2, the second connecting terminal 36 is inserted into the first connecting terminal 5k of the electronic device 5, thereby achieving electrical connection between the terminals.

(Engaging mechanism between mechanical equipments 8 and 15)

As shown in FIG. 4, operating parts 30 and 31 are provided on an upper surface of the mounting part 4. The operating part 30 is composed of plastic, for example. The operating part 30 is in an approximately rectangular shape, as viewed from the top, and a projection is formed on its reverse surface. The operating part 30 is in an approximately T shape, as viewed from the side. The operating part 30 is provided such that it can be moved backward and forward (in an a direction) upon being guided by a side edge of an opening 27. The operating part 31 is composed of plastic, for example. The operating part 31 is in an approximately rectangular shape, as viewed from the top, and a projection is formed on its reverse surface. The operating part 31 is in an approximately T shape, as viewed from the side. The operating part 31 is provided such that it can be moved backward and forward (in a b direction) upon being guided by a side edge of the opening 26.

As shown in FIG. 6, a projection formed on the reverse surface of the operating part 30 is engaged with an engaging part driving plate 32. The engaging part driving plate 32 is provided so as to be horizontally rotatable around a shaft 33 formed in the base part 13. The engaging part driving plate 32 is rotated when the operating part 31 is moved backward and forward. A pin (indicated by a broken line) is provided in an upright state in the engaging part driving plate 32, and the pin is inserted into a hole formed in an engaging part 34. The engaging part 34 is guided by a guide formed in the base part 13, and is moved backward and forward by the rotation of the engaging part driving plate 32. A front end of the engaging part 34 is obliquely notched. When the mechanical equipment 8 is inserted into the accessory 1, the mechanical equipment 8 is abutted against the obliquely notched portion, so that the engaging part 34 slides backward.

When the user moves the operating part 30 backward and forward, the engaging part driving plate 32 is rotated, and the engaging part 34 is also moved backward and forward by the rotation. When the user moves the operating part 30 backward, the engaging part 34 is also moved backward. Accordingly, a front end of the engaging part 34 comes off an engaging hole of the mechanical equipment 8. Consequently, the engagement of the mechanical equipment 8 by the engaging part 34 is released, thereby making it possible to take out the mechanical equipment 8 from the accessory 1. When the user moves the operating part 30 forward (in a case where a spring is provided, the operating part 30 is moved forward by a force of the spring), the engaging part 34 is also moved forward. Accordingly, the front end of the engaging part 34 is inserted into the engaging hole of the mechanical equipment 8. The mechanical equipment 8 is engaged by the engaging part 34. The mechanical equipment 8 cannot be taken out of the accessory 1 even by merely making an attempt to pull out the mechanical equipment 8.

A projection formed on the reverse surface of the operating part 31 is engaged with an engaging part 35. The engaging part 35 is guided by a guide formed in the base part 13, and is moved backward and forward by the back-and-forth movement of the operating part 31. A front end of the engaging part 35 is obliquely notched. When the mechanical equipment 15 is inserted into the accessory 1, the mechanical equipment 15 is abutted against the obliquely notched portion, so that the engaging part 35 slides backward.

When the user moves the operating part 31 backward, the engaging part 35 is moved backward, and a front end of the engaging part 35 comes off an engaging hole of the mechanical equipment 15. Consequently, the engagement of the mechanical equipment 15 by the engaging part 35 is released, thereby making it possible to take out the mechanical equipment 15 from the accessory 1. When the user moves the operating part 31 forward (in a case where a spring is provided, the operating part 31 is moved forward by a force of the spring), the engaging part 35 is also moved forward. Accordingly, the front end of the engaging part 35 is inserted into the engaging hole of the mechanical equipment 15. The mechanical equipment 15 is engaged by the engaging part 35. The mechanical equipment 15 cannot be taken out of the accessory 1 even by merely making an attempt to pull out the mechanical equipment 15.

The engaging parts 34 and 35 respectively inhibit or allow the mechanical equipments 8 and 15 from being taken out or to be taken out depending on states where the operating parts 30 and 31 are operated (for example, whether the operating parts are at a front position or a rear position).

(Operating mechanism for engaging and ejecting electric device 5)

An operation lever 37 (37R) is provided on a right side surface at the rear of the accessory 1, and an operation lever 37 (37L) is provided on a left side surface at the rear thereof.

The operation lever 37 is composed of plastic, for example. The operation lever 37R is provided so as to be horizontally rotatable around a shaft 38 formed in the base part 13. A rotating plate 39 is composed of a metal, for example. The rotating plate 39 is provided so as to be horizontally rotated around the shaft 38 in synchronization with the operation of the operation lever 37R. The details of a connecting structure of the operation lever 37R and the rotating plate 39 will be described later. When the operation lever 37 is in its closed state (a state shown in FIG. 6), an outer surface of the operation lever 37 is made approximately flush with an outer surface of the base part 13 constituting the base 6.

A hook driving plate 40 is composed of plastic, for example. A lower pin 41 fixed to the rotating plate 39 is inserted into a hole formed in the hook driving plate 40. The hook driving plate 40 is moved backward and forward in synchronization with the rotation of the rotating plate 39 by the lower pin 41. A hook 42 is composed of plastic, for example, and is provided so as to be movable backward and forward (in a d direction) and so as to be urged forward. An upper end of the hook 42 is formed in a hook shape, and the hook-shaped upper end projects toward an upper surface of the mounting part 4. The hook-shaped upper end is engaged with a receiving part 60 (see FIG. 8) in the electric device 5 which is placed on the mounting part 4. A lower end (root) of the hook 42 is abutted against a cam 41a (see FIG. 9). The movement of the hook driving plate 40 is transmitted to the hook 42 through the cam 41a.

When the operation lever 37R is pulled in a C direction (in an opening direction), the rotating plate 39 which is synchronized with the operation lever 37R is rotated in a clockwise direction. The rotation of the rotating plate 39 is transmitted to the hook driving plate 40 by the lower pin 41. The hook driving plate 40 is moved backward, and the hook 42 is moved backward through the cam 41a. Consequently, the hook 42 comes off the receiving part 60 in the electronic device 5, and the hook 42 releases the engagement of the electronic device.

When the operation lever 37R is rotated in a direction opposite to a C direction (in a closing direction), the rotating plate 39 is rotated in a counterclockwise direction, and the hook driving plate 40 and the hook 42 are moved forward. Consequently, the hook 42 is caught on the receiving part 60 in the electronic device 5, to engage the electronic device 5. The hook 42 thus engages and releases the engagement of the electronic device 5 depending on an operating state (for example, an opened state or a closed state) of the operation lever 37R.

An ejecting part driving plate 43 is composed of plastic, for example. The ejecting part driving plate 43 is formed so as to extend in a back-and-forth direction, and has an inclined-shaped portion whose front is higher. An upper pin 44 fixed to the rotating plate 39 is inserted into a front end of the ejecting part driving plate 43, and the ejecting part driving plate 43 is moved backward and forward by the rotation of the rotating plate 39. An ejecting part 45 is composed of plastic, for example, and is formed in an approximately rectangular parallelepiped shape. The ejecting part 45 is provided so as to be movable upward and downward upon being guided by the surrounding member. A bottom surface of the ejecting part 45 is abutted against the inclined-shaped portion of the ejecting part driving plate 43. Accordingly, the ejecting part 45 is moved upward and downward by the back-and-forth movement of the ejecting plate driving plate 43, and projects from the mounting part 4 at the time of the upward movement, while being approximately flush with the mounting part 4 at the time of the downward movement.

That is, when the operation lever 37R is rotated in a direction opposite to a C direction (in a closing direction), the rotating plate 39 is rotated in a counterclockwise direction, the ejecting part driving plate 43 is moved forward, and the ejecting part 45 is moved downward. Accordingly, the ejecting part 45 does not project from the mounting part 4.

The user pulls the operation lever 37R in a C direction (in an opening direction), so that the rotating plate 39 is rotated in a clockwise direction, the ejecting part driving plate 43 is moved backward, and the ejecting part 45 is moved upward to project from the mounting part 4. The operation lever 37R is thus pulled in a C direction (in an opening direction), so that the ejecting part 45 projects from the mounting part 4 to eject the electronic device 5, and the hook 42 releases the engagement of the electronic device 5, as described above. Ejection is realized by this series of operations.

Similarly, a hook 42L engages or releases the engagement of the electronic device 5 in response to a state where an operation lever 37L which is arranged on the left side of the base part 13 is operated (for example, in an opened state or a closed state). When the operation lever 37L is operated so as to be rotated in a C direction (in an opening direction) around the shaft 38L, a rotating plate 39L is rotated in a counterclockwise direction. A hook driving plate 40L is moved backward by a lower pin 41L of the rotating plate 39L, the hook 42L is also moved backward through a cam 41La, and the hook 42L releases the engagement with the electronic device 5. Further, the ejecting part driving plate 43L is moved backward through an upper pin 44L fixed to the rotating plate 39L, and an ejecting part 45L projects from the mounting part 4, to eject the electronic device 5.

(Mechanism for controlling operations of operating parts 30 and 31 and operation levers 37R and 37L)

An operating part 46 is composed of plastic, for example. The operating part 46 is provided so as to be movable rightward and leftward (in an e direction) upon being guided by an edge of an opening formed on the bottom surface of the base part 13. Since the operating part 46 is provided on a reverse surface of the base 6, the user operates the operating part 46 on the side of the reverse surface of the base 6. A projection 47 projecting forward is formed in the operating part 46. The projection 47 is engaged with a control plate 48.

The control plate 48 is composed of a metal, for example, and has a shape extending in a right-and-left direction. A folded portion 49 folded downward is formed at the front right of the control plate 48, and has long holes 50 and 51 extending in a right-and-left direction formed in its suitable places. Pins fixed to the base part 13 are respectively inserted into the long holes 50 and 51, so that the control plate 48 can be moved rightward and leftward (in an f direction) upon being guided by the pins. A recess 52 is formed at a rear edge of an approximately central portion of the control plate 48, and the projection 47 is inserted into the recess 52. Further, three recesses g, h, and i are formed side by side in the horizontal direction at a right rear edge of the control plate 48.

A moving plate 53 is composed of a metal, for example, and is provided so as to be movable backward and forward. The moving plate 53 comprises an abutting part 54 against which a front end 58 of the locking part 9 is abutted and a moving part 55 connected to the abutting part 54. A pin 56 is fixed to a reverse surface at a front end of the moving part 55. The pin 56 is engaged with any one of the three recesses g, h, and i depending on the position of the control plate 48.

An example of the locking part 9 is one of a Kensington type. One end of a chain (not shown) is fixed to a projection 57 provided on an outer surface of the cylinder, and the other end of the chain is fixed to a fixture (not shown) provided in the desk 12 or a drawer, for example. Even if the user inserts the key 10 into the locking part 9, the locking part 9 is in its unlocked state before the key 10 is turned (see FIG. 6). The locking part 9 and the base part 13 are not fixed to each other. Accordingly, the locking part 9 can be detached. The locking part 9 is inserted into the base part 13, so that the abutting part 54 is pressed in a i direction by the front end 58 irrespective of whether or not locking is performed. That is, when the locking part 9 is inserted into the base part 13, the locking part 9 is inserted after the position of the control plate 48 is selected, and is fixed to the base part 13. The front end 58 of the locking part 9 and a fixed guide (not shown) are inserted into a long hole (not shown) of the base part 13. By rotating the key 10 through 90°, the front end 58 of the locking part 9 is similarly rotated through 90°, and is fixed with the base part 13 interposed between the main body of the locking part 9 and the inside of the front end 58. In this case, the locking part 9 is fitted in the long hole of the base part 13 by the fixed guide, so that it can be neither rotated nor pulled out of the long hole (the locked state). Consequently, the accessory 1 can be only moved in a range in which the length of the chain is allowed, thereby preventing the accessory 1 from being stolen. Further, the front end 58 advances forward, so that the moving plate 53 is moved forward. An engaged state between the pin 56 and any one of the three recesses g, h, and i is held. Even if the user pulls out the key 10, the locked state is maintained.

(Assembling of function expanding device, accessory, and electronic device)

The function expanding device 3 is placed on the desk 12, the accessory 1 is placed on the function expanding device 3 such that the projection 11 is inserted into the hole of the base 6 (see FIG. 2), the mechanical equipment 8 is housed in the accessory 1 from the opening 7 of the accessory 1, and the operating part 30 is moved forward to engage the mechanical equipment 8. When the operating part 30 is urged forward by the spring, the mechanical equipment 8 can be engaged without bothering the user. Similarly, the mechanical equipment 15 is housed in the accessory 1 from the opening 14 of the accessory 1, and the operating part 31 is moved forward to engage the mechanical equipment 15. When the operating part 31 is urged forward by the spring, the mechanical equipment 15 can be engaged without bothering the user.

In a state where the operation lever 37 is closed, the electronic device 5 is then placed on the accessory 1. Specifically, the electronic device 5 is placed on the accessory 1 by respectively inserting the second projections 28 and 29 in the accessory 1 into the second holes 5f and 5g provided at the front of the electronic device 5. At this time, the first projections 21 and 22 are respectively fitted in the first holes 5d and 5c in the main body 5b of the electronic device 5. Further, the hook 42 is movable backward and forward (in a d direction). Accordingly, the hook-shaped front end of the hook 42 is pressed by the electronic device 5 placed on the mounting part 4, so that the hook 42 is moved backward. When the hook-shaped front end of the hook 42 is completely inserted into a hole 59 in the electronic device 5, the hook 42 is moved forward, so that the hook-shaped front end is engaged with the receiving part 60. Further, in a state where the operation lever 37 is closed, the ejecting part driving plates 43 and 43L are positioned on the forefront side, and the ejecting parts 45 and 45L are at their lowermost points in the vertical direction (in an m direction) and does not attempt to eject the electronic device 5. Accordingly, the electronic device 5 is stably fixed to the accessory 1.

(Detailed description of operation lever)

The operation lever 37 will be described in detail on the basis of FIGS. 8 to 10. The operation lever 37R is constructed by integrally forming a lever 64 and a shaft 65. The shaft 38 is provided upon penetrating a flat washer 66, a bearing 67, and a fixed plate 68. That is, the shaft 38 is inserted into a hole of the bearing 67, and the bearing 67 is inserted into a hole formed in the shaft 65 constituting the operation lever 37. A lower end of the shaft 38 is fixed to the fixed plate 68 by caulking or the like. A small-diameter portion is formed in an upper part of the shaft 38, and an E-type snap ring 69 is positioned above the flat washer 66 and is attached to the small-diameter portion.

The bearing 67 is composed of brass, for example, and is formed in an approximately cylindrical shape. A first notch 70 is formed in an upper suitable place, and a second notch 71 is formed at a lower predetermined position. An outer shape of the bearing 67 forms an approximately D shape, as viewed from the bottom, by the second notch 71. Similarly, the shape of a hole formed in the shaft 65 forms an approximately D shape, as viewed from the bottom, because a flat surface 81 is formed.

Predetermined clearances p and g are provided between the shaft 65 and the bearing 67. In the present embodiment, the sum of p and g is set to not less than 0.05 mm.

The rotating plate 39 is constructed by forming a first flat portion 72 and a second flat portion 73 in different steps. The bearing 67 is inserted into a hole formed in the first flat portion 72. A folded portion 74 which is partially folded downward is formed in a suitable place of the first flat portion. 72. A predetermined clearance r is provided, as shown in FIG. 9, between the first notch 70 of the bearing 67 and the folded portion 74 of the rotating plate 39.

An upper pin 44 is fixed to an upper part of the second flat portion 73 of the rotating plate 39, and a lower pin 41 is fixed to a lower part thereof. The lower pin 41 is inserted into a hole 75 formed in the hook driving plate 40.

The can 41a is provided so as to be horizontally rotatable upon being supported on a shaft 76 fixed to the base part 13. A spring 77 urges the cam 41a in a counterclockwise direction. A front surface of the cam 41a is abutted against a rear surface of the hook driving plate 40, and a rear surface of the cam 41a is abutted against a front surface of the hook 42. The hook 42 may be urged forward. For example, a movable member 83 which is abutted against the rear of the cam 41a and is movable in a d direction is provided, the movable member 83 and the hook 42 are fixed to each other, and a spring 84 is provided at the rear of the movable member 83, thereby making it possible to urge the movable member 84 and the hook 42 forward. Further, the operation lever 37R is urged in a counterclockwise direction by a spring 78. Unless the user operates the lever 64, the operation lever 37R assumes its closed state.

When a mechanism for transmitting an operating force of the operation lever 37R to the hook 42 is defined as a driving mechanism 79, the driving mechanism 79 comprises the shaft 38, the flat washer 66, the bearing 67, the fixed plate 68, the E-type stop ring 69, the rotating plate 39, the lower pin 41, the hook driving plate 40, the cam 41a, and so forth, in the above-mentioned example.

A predetermined clearance is provided between the operation lever 37R and the driving mechanism 79. In this example, the predetermined clearances p and g are provided between the shaft 65 constituting the operation lever 37 and the bearing 67 constituting the driving mechanism 79.

Furthermore, the driving mechanism 79 is constituted by a plurality of members, and a predetermined clearance is provided between at least one pair of members out of the plurality of members. In this example, the predetermined clearance r is provided between the first notch 70 formed in the bearing 67 and the folded portion 74 formed in the rotating plate 39.

(Opening operation of operation lever)

Figure 9:
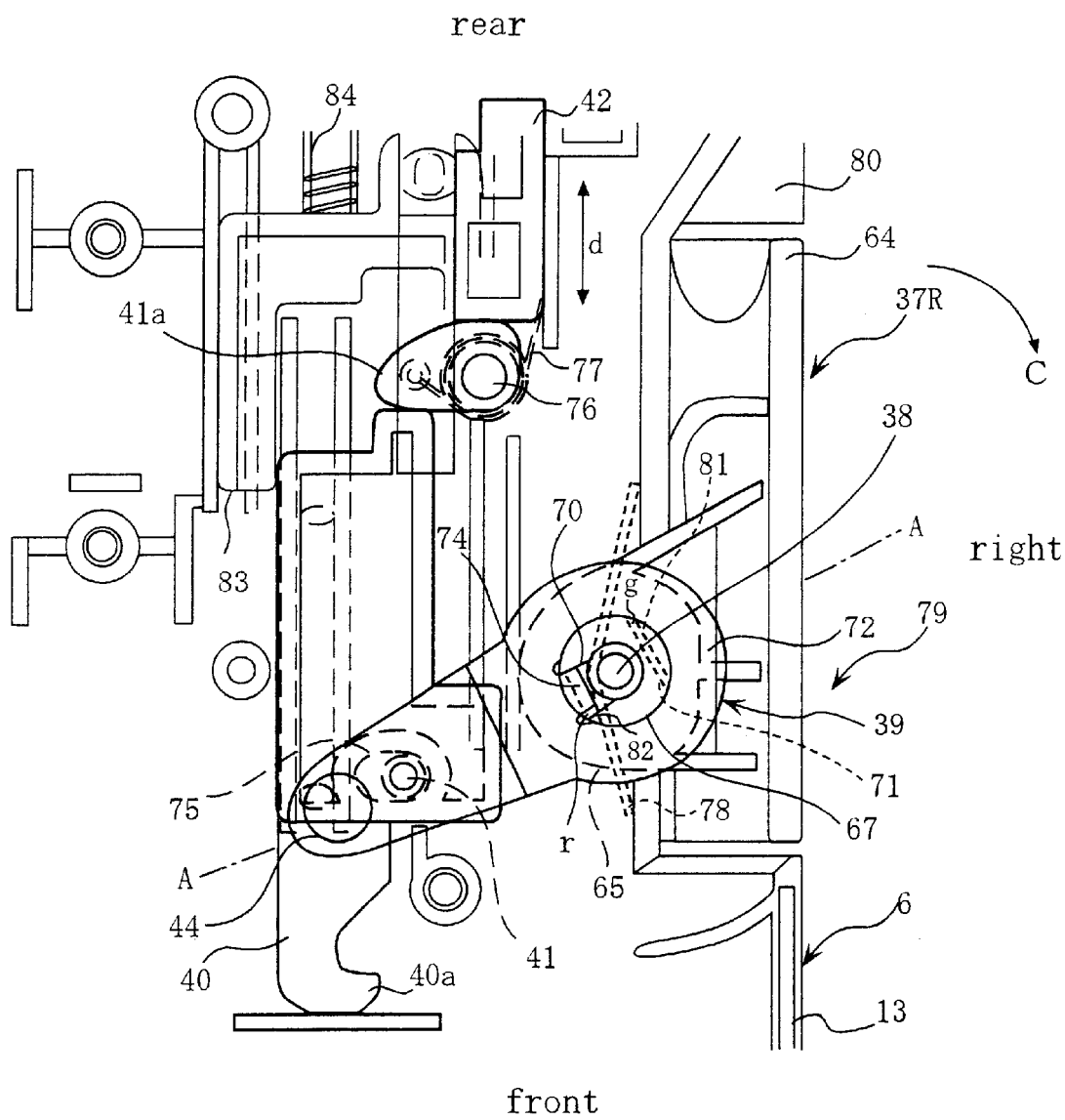
FIG. 9 is an enlarged view showing a state where an operation lever of an accessory is closed and a driving mechanism, etc. arranged in the vicinity thereof.
Figure 10:
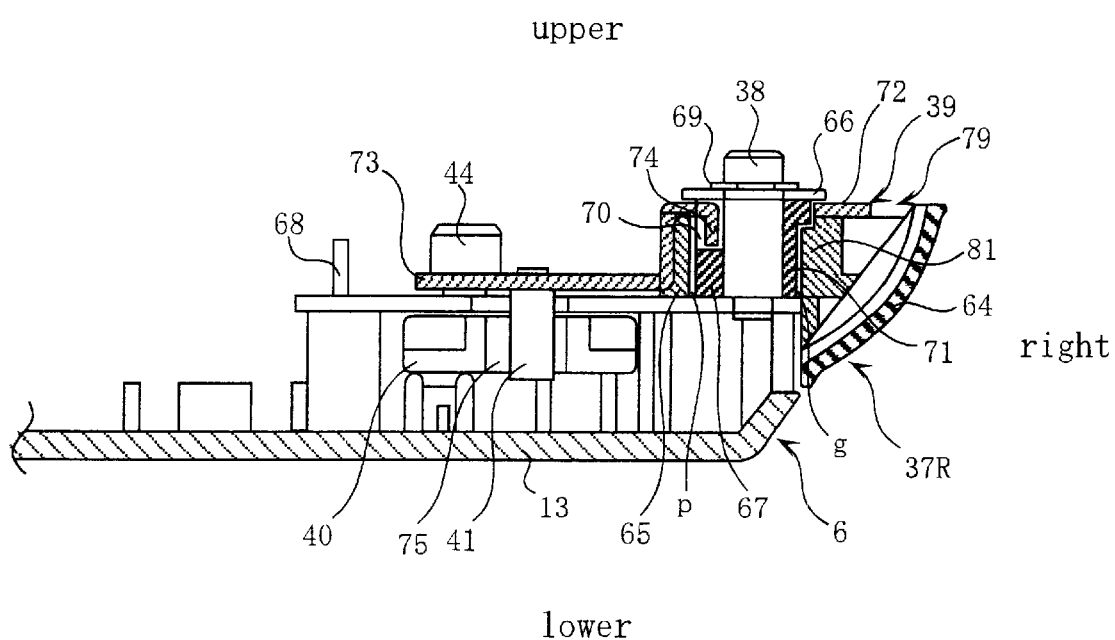
FIG. 10 is a cross-sectional view taken along a line A—A shown in FIG. 9.
Figure 11:
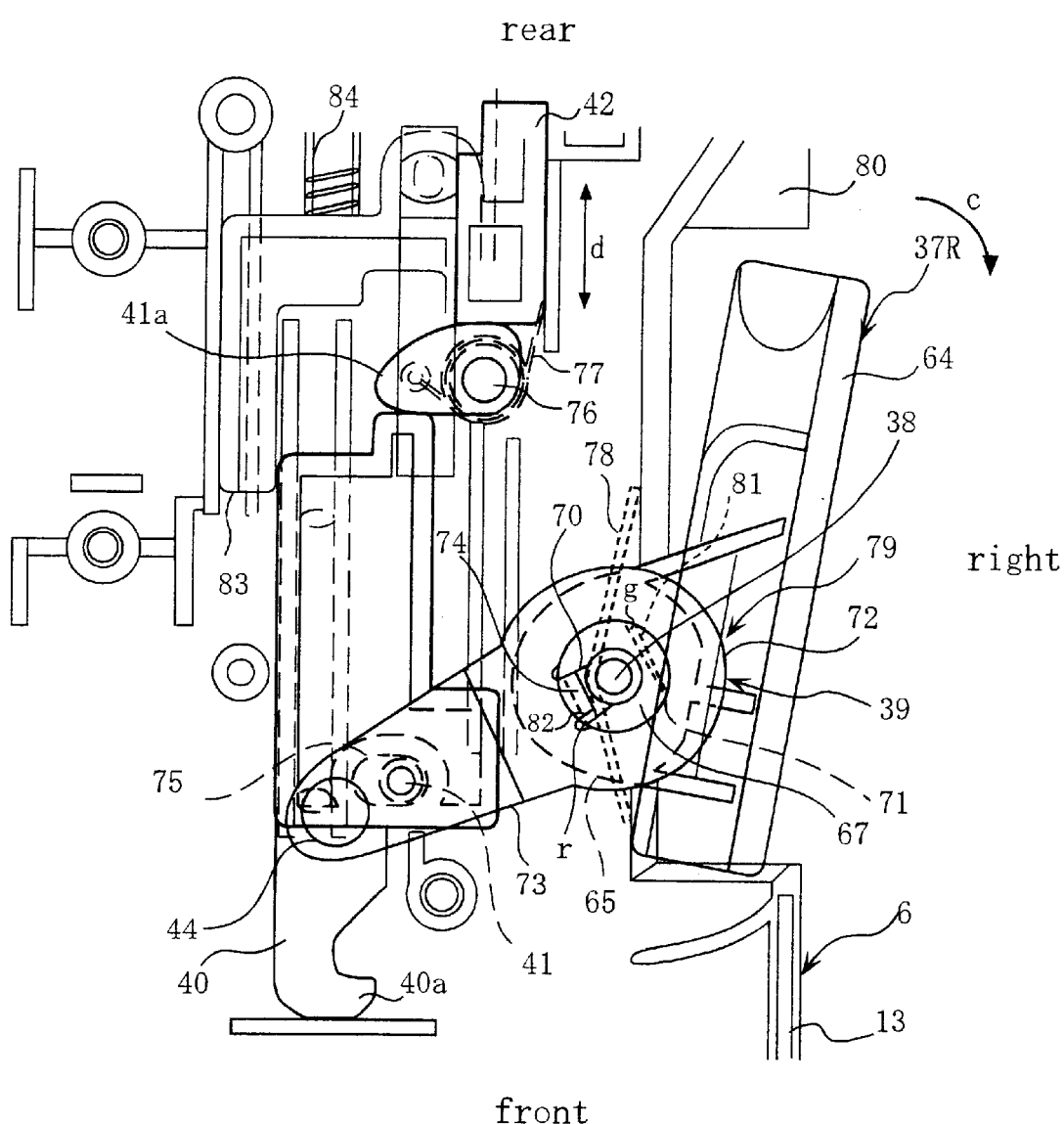
FIG. 11 is an enlarged view showing a state where an operation lever of an accessory is slightly opened and a driving mechanism, etc. arranged in the vicinity thereof.

When the electronic device 5 fixed to the accessory 1 is detached, the user inserts his or her finger into a recess of the base part 13 (see FIG. 9). When an end at the rear of the lever 64 is slightly rotated in a C direction in this inserted state, a state shown in FIG. 11 occurs. When the lever 64 is only slightly rotated in a C direction, the shaft 65 in the operation lever 37R is slightly rotated in a clockwise direction. However, the bearing 67 has not been rotated yet by the predetermined clearances p and g.

When the lever 64 is further rotated in a C direction, the second notch 71 formed in the bearing 67 is abutted against the flat surface part 81 formed in the shaft 65. The bearing 67 starts to be rotated after the abutment. In a state where the hook 42 is engaged with the receiving part 60 in the electronic device 5, that is, in a state where the hook driving plate 40 is moved toward the forefront so that the rotating plate 39 is rotated most in a counterclockwise direction, however, the clearance r is provided between the first notch 70 formed in the bearing 67 and the folded portion 74 formed in the rotating plate 39. Even if the bearing 67 is slightly rotated, therefore, an abutted surface 82 of the first notch 70 is not abutted against the folded portion 74, and the rotating plate 39 has not been rotated yet.

When the lever 64 is further rotated in a C direction, the shaft 65 and the bearing 67 are further rotated, the abutted surface 82 of the first notch 70 is abutted against the folded portion 74, and the rotating plate 39 starts to be rotated.

A state elapsed from the time when the operation for rotating the operation lever 37R is thus started until the rotating plate 39 starts to be rotated is referred to as an initial state. As described above, in the initial state, the operation lever 37R can be opened to a predetermined angle from its closed state by the presence of the clearances p, g, and r.

In the initial state, the rotating plate 39 is not rotated, so that the lower pin 41, the hook driving plate 40, and the cam 41a are not moved (in a stationary state). Consequently, the hook 42 is maintained in its engaged state with the electronic device 5. In the initial state, a spring force of the spring 77 provided in the cam 41a and a spring force of a spring (for example, the spring 84) provided in the hook 42 are not exerted on the operation lever 37R.

In the initial state, only a spring force of the spring 78 is exerted on the operation lever 37R. If the spring force of the spring 78 is weakened, therefore, the user can open the operation lever 37R to a predetermined angle in a C direction by a small force.

In the initial state, the rotating plate 39, the hook driving plate 40, and the cam 41a which constitute the driving mechanism 79 are not moved. Accordingly, a force for moving the members is not required. That is, in the initial state, the members constituting the driving mechanism 79 are not moved, that is, the driving mechanism 79 is caused to stand still. Accordingly, in the initial state, the user can open the operation lever 37 to a predetermined angle in a C direction by a small force.

Figure 8A:
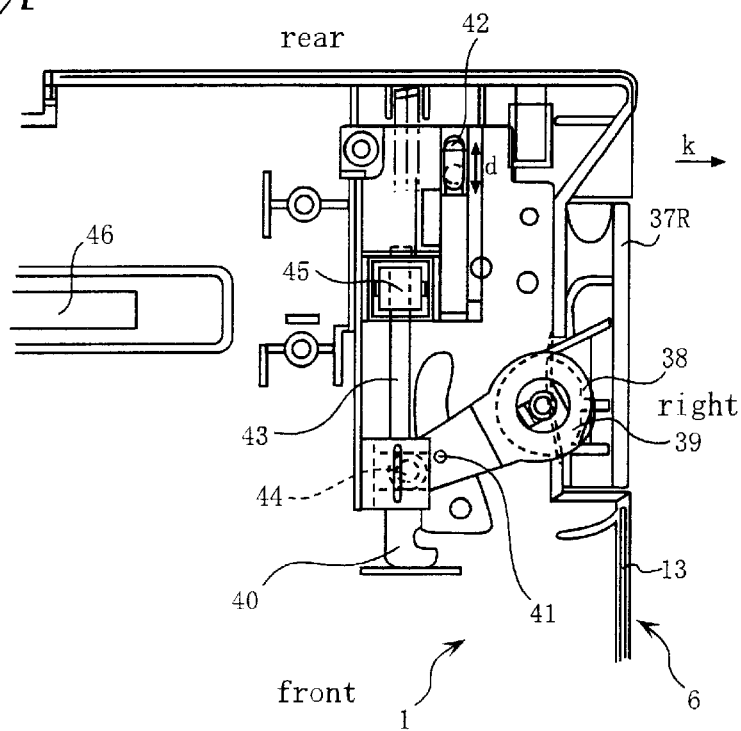
FIG. 8 (*a*) is an enlarged view showing an operation lever, etc. of an accessory, and FIG. 8 (*b*) is a side view showing an internal structure corresponding to FIG. 8 (*a*).
Figure 8B:
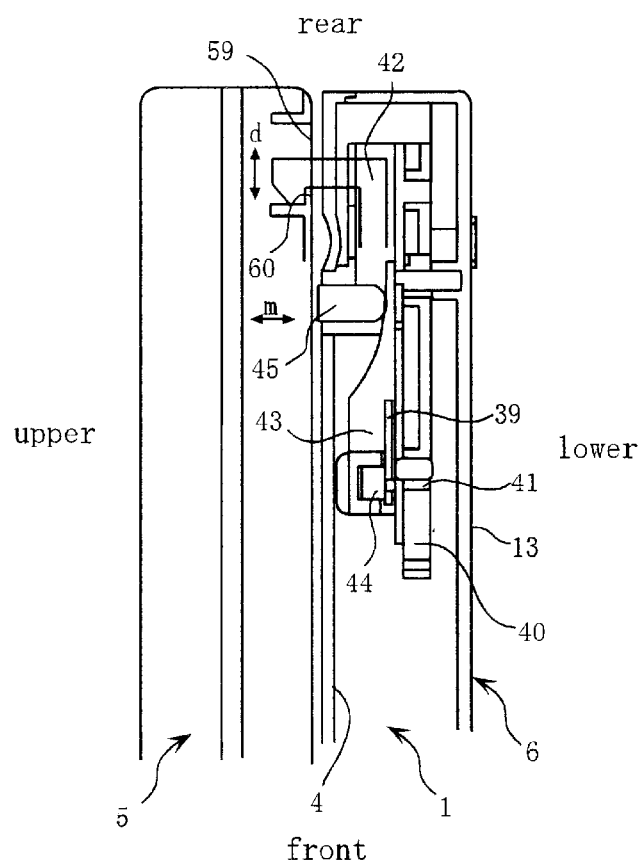

Furthermore, as described on the basis of FIG. 8, the ejecting part 45 is placed on an inclined-shaped portion of the ejecting part driving plate 43, and the ejecting part driving plate 43 is moved backward, to eject the ejecting part 45 upward and eject the electronic device 5. In the initial state, however, the rotating plate 39 is not rotated, so that the ejecting part driving plate 43 is not moved, not to eject the ejecting part 45. In the initial state, therefore, it is possible to prevent the own weight of the electronic device 5 from being produced as a force against an operating force of the operation lever 37R through the ejecting part 45.

Accordingly, the user can open the operation lever 37R to a predetermined angle in a C direction by a small force.

Even if a recess 80 in the base part 13 provided for the user catching his or her finger on the operation lever 37R is small, the operation lever 37R can be easily opened to a predetermined angle from its closed state. When the operation lever 37R is further opened through more than the predetermined angle, a relatively large force is required. However, the operation lever 37R is opened through the predetermined angle. Accordingly, the user can tightly catch his or her finger on the operation lever 37R. Therefore, a large force can be easily applied to the operation lever 37R.

Figure 12A:
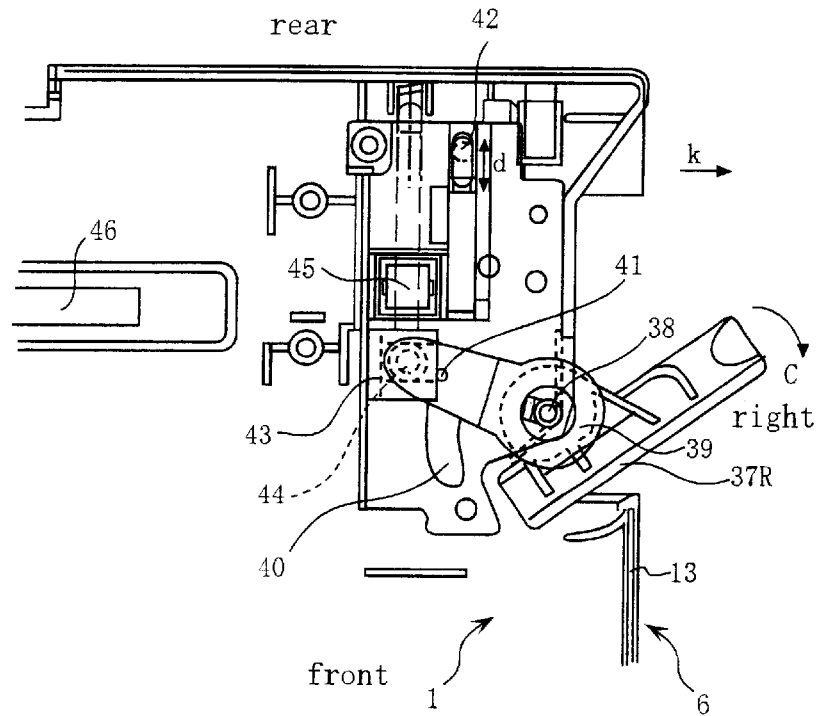
FIG. 12 (*a*) is an enlarged view of a state where an operation lever of an accessory is fully opened, and FIG. 12 (*b*) is a side view corresponding to FIG. 12 (*a*).
Figure 12B:
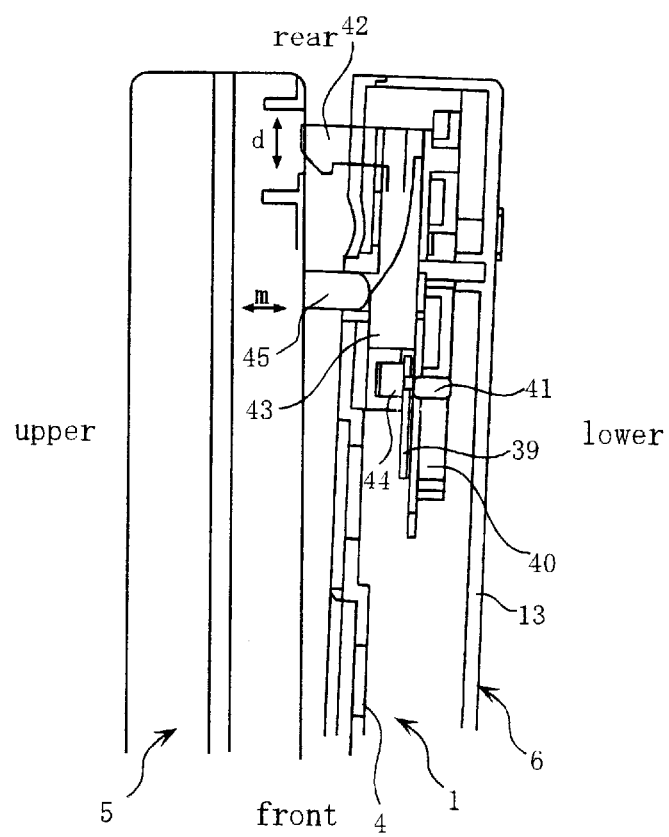

When the operation lever 37R is further opened from the predetermined angle, the rotating plate 39 is rotated in a clockwise direction (see FIG. 12). The hook driving plate 40 which is synchronized with the lower pin 41 fixed to the rotating plate 39 is moved backward, so that the cam 41a is rotated in a clockwise direction. Although a portion, whose distance from the shaft 76 is short, of the cam 41a is abutted against the hook 42 in the initial state, a portion, whose distance from the shaft 76 is gradually increased, of the cam 41a is abutted against the hook 42 by the rotation in a clockwise direction. Consequently, the hook 42 is moved backward.

Although the hook-shaped upper end of the hook 42 is engaged with the receiving part 60 in the electronic device 5 placed on the mounting part 4, the hook-shaped upper end comes off the receiving part 60 by the backward movement of the hook 42. Accordingly, the hook 42 releases the engagement of the electronic device 5.

Furthermore, when the operation lever 37 is further opened from the predetermined angle, and the rotating plate 39 is rotated in a clockwise direction, the ejecting part driving plate 43 which is synchronized with the upper pin 44 fixed to the rotating plate 39 is moved backward, and the ejecting part 45 is moved upward, to eject the electronic device 5. A clearance is formed between the acessory 1 and the electronic device 5 by the ejecting operation. The user can insert his or her finger into the clearance and catches the finger on the electronic device 5, thereby making it possible to easily detach the electronic device 5 from the accessory 1.

The mounting part 4 in the accessory 1 is exposed by detaching the electronic device 5, thereby making it possible to operate the operating parts 30 and 31. When the operating part 30 is slid backward in order to take out the mechanical equipment 8, the engaging part driving plate 32 is slightly rotated, and the engaging part 34 is moved backward by the rotation. Consequently, the engagement of the mechanical equipment 8 by the engaging part 34 is released, thereby making it possible to take out the mechanical equipment 8 from the accessory 1.

When the operating part 31 is slid backward in order to take out the mechanical equipment 15, the engaging part 35 is also moved backward. Consequently, the engagement of the mechanical equipment 15 by the engaging part 35 is released, thereby making it possible to take out the mechanical equipment 15 from the accessory 1.

(State where pin 56 is engaged with recess g: second position)

Description was made of a state where the pin 56 is engaged with the recess g (a second position). That is, at the second position, all the operations of the operating parts 30 and 31 and the operation levers 37R and 37L are allowed. At the second position, the operations of the operating parts 30 and 31 are thus allowed. Accordingly, the mechanical equipments 8 and 15 can be attached to the accessory 1, and the mechanical equipments 8 and 15 can be taken out of the accessory 1, as described above. Further, an operation for opening the operation lever 37 is allowed. Accordingly, the electronic device 5 can be ejected by releasing the engagement of the electronic device 5 by the hook 42 and moving the ejecting part 45 upward. In order to select the second position, the operating part 46 is operated with the locking part 9 in its unlocked state, to align the recess g of the control plate 48 with the pin 56.

(State where pin 56 is engaged with recess h: third position)

As shown in FIG. 13, in a state where the pin 56 is engaged with the recess h (a third position), the operation levers 37R and 37L can be operated. However, the operating parts 30 and 31 cannot be operated. In order to select the third position, the operating part 46 is operated with the locking part 9 in its unlocked state, to align the recess h of the control plate 48 with the pin 56.

When the user turns the key 10 to perform locking, the moving plate 53 advances in a j direction upon being pressed by the front end 58. The moving plate 53 advances in a i j direction, so that the pin 56 fixed thereto also advances in a j direction. The pin 56 is inserted into the recess h, so that the control plate 48 is locked.

In this state, the folded portion 49 of the control plate 48 is abutted against the rear of the engaging part 34. Accordingly, the operating part 30 cannot be slid backward, so that the engaged state of the mechanical equipment 8 cannot be released. Further, a projection (not shown) is formed on a reverse surface of the engaging part 35. The projection is abutted against the edge 61 of the control plate 48. Therefore, the operating part 31 cannot be slid backward. Accordingly, the engaged state of the mechanical equipment 15 cannot be released.

When the control plate 48 is thus set at the third position, to achieve locking by the locking part 9, the engaged states of the mechanical equipments 8 and 15 cannot be released. Accordingly, the mechanical equipments 8 and 15 cannot be taken out and therefore, can be prevented from being stolen.

At the third position, the operation levers 37R and 37L can be operated. By pulling the operation lever 37R and 37L in a C direction, the rotating plate 39 is rotated in a clockwise direction, the rotating plate 39L is rotated in a counterclockwise direction, the hook driving plates 40 and 40L are moved backward, the cams 41a and 41La are rotated, the hooks 42 and 42L are moved backward, and the hooks 42 and 42L are moved backward, so that the engagement of the electronic device 5 is released. Further, the ejecting part driving plates 43 and 43L are moved backward, and the ejecting parts 45 and 45L are raised, to eject the electronic device 5.

When the control plate 48 is set at the third position to perform locking, therefore, the electronic device 5 can be freely attached and detached to and from the accessory 1, and the operating parts 30 and 31 cannot be operated even if they are exposed because the electronic device 5 is detached from the accessory 1, thereby making it possible to prevent the mechanical equipments 8 and 15 from being stolen.

(State where pin 56 is engaged with recess i: first position)

Figure 14:
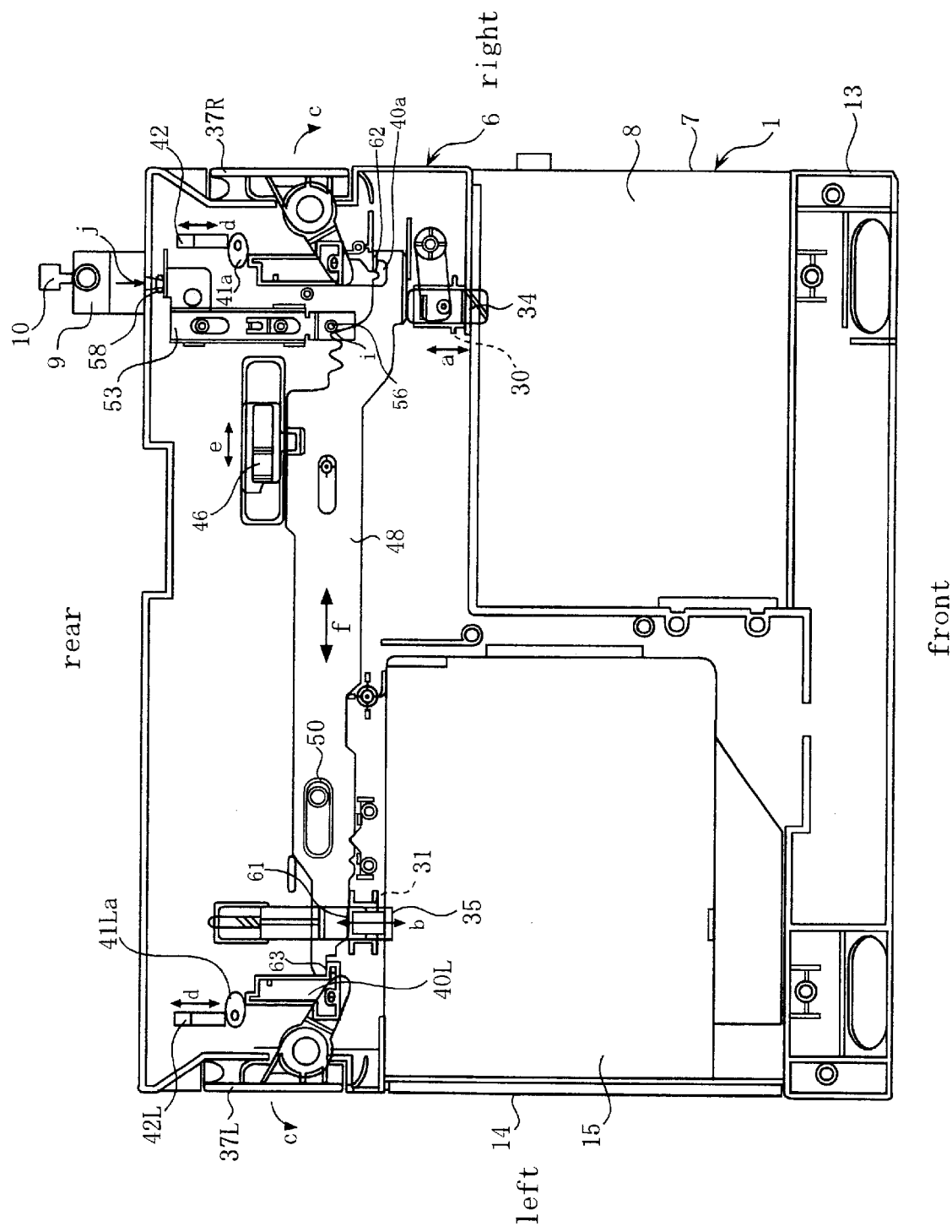
FIG. 14 is a diagram schematically showing an internal structure of an accessory and a plan view of a state where a control plate is placed at a first position and is locked.

In a state where the pin 56 is engaged with the recess i (a first position), as shown in FIG. 14, neither the operating parts 30 and 31 nor the operating levers 37R and 37L can be operated. In order to select the first position, the operating part 46 is operated in a state where the locking part 9 is in its unlocked state, to align the recess i of the control plate 48 with the pin 56.

When the user turns the key 10 to perform locking, the moving plate 53 advances in a j direction upon being pressed by the front end 58. The moving plate 53 advances in a j direction, so that the pin 56 fixed thereto also advances in a i direction. The pin 56 is inserted into the recess i of the control plate 48, so that the control plate 48 is locked.

In this state, the folded portion 49 of the control plate 48 is abutted against the rear of the engaging part 34, so that the operating part 30 cannot be slid backward. Accordingly, the engaged state of the mechanical equipment 8 cannot be released. Further, a projection (not shown) is formed on the reverse surface of the engaging part 35. The projection is abutted against the edge 61 of the control plate 48. Therefore, the operating part 31 cannot be slid backward, so that the engaged state of the mechanical equipment 15 cannot be released.

Furthermore, at the first position, the hook 40a formed at a front end of the hook driving plate 40 is engaged with the folded portion 62 of the control plate 48. Accordingly, the hook driving plate 40 cannot be moved backward.

Even if an attempt to open the operation lever 37R is made, therefore, the operation lever 37R cannot be opened through not less than a predetermined angle. Since the hook driving plate 40 cannot be moved, the hook 42 cannot be caused to retreat. Accordingly, the engaged state of the electronic device 5 is maintained. Further, the ejecting part driving plate 43 which is synchronized with the operation lever 37R cannot be moved backward. Therefore, the ejecting part 45 cannot be raised, and the electronic device 5 cannot be ejected.

Similarly, a step formed at a right edge of the hook driving plate 40L is engaged with a step 63 formed at a left end of the control plate 48. Accordingly, the hook driving plate 40L cannot be moved backward.

Even if an attempt to open the operation lever 37L is made, therefore, the operation lever 37L cannot be opened through not less than the predetermined angle. Since the hook driving plate 40L cannot be moved, the hook 42L cannot be caused to retreat. Accordingly, the engaged state of the electronic device 5 is maintained. Further, the ejecting part driving plate 43L which is synchronized with the operation lever 37L cannot be moved backward. Accordingly, the ejecting part 45 L cannot be raised. Therefore, the electronic device 5 is not ejected.

When the control plate 48 is set at the first position to lock the locking part 9, therefore, the engaged states of the mechanical equipments 8 and 15 cannot be released. Accordingly, the mechanical equipments 8 and 15 cannot be taken out and therefore, can be prevented from being stolen. Further, the rotation of the operation lever 37 is limited. Accordingly, the electronic device 5 cannot be ejected and therefore, can be prevented from being stolen.

The operating part 46 is provided on the reverse surface of the base 6. Therefore, a third person other than the user cannot easily know which of the first position, the second position, and the third position is the position of the control plate 48.

(Containment of driving battery in accessory 1)

Figure 15A:
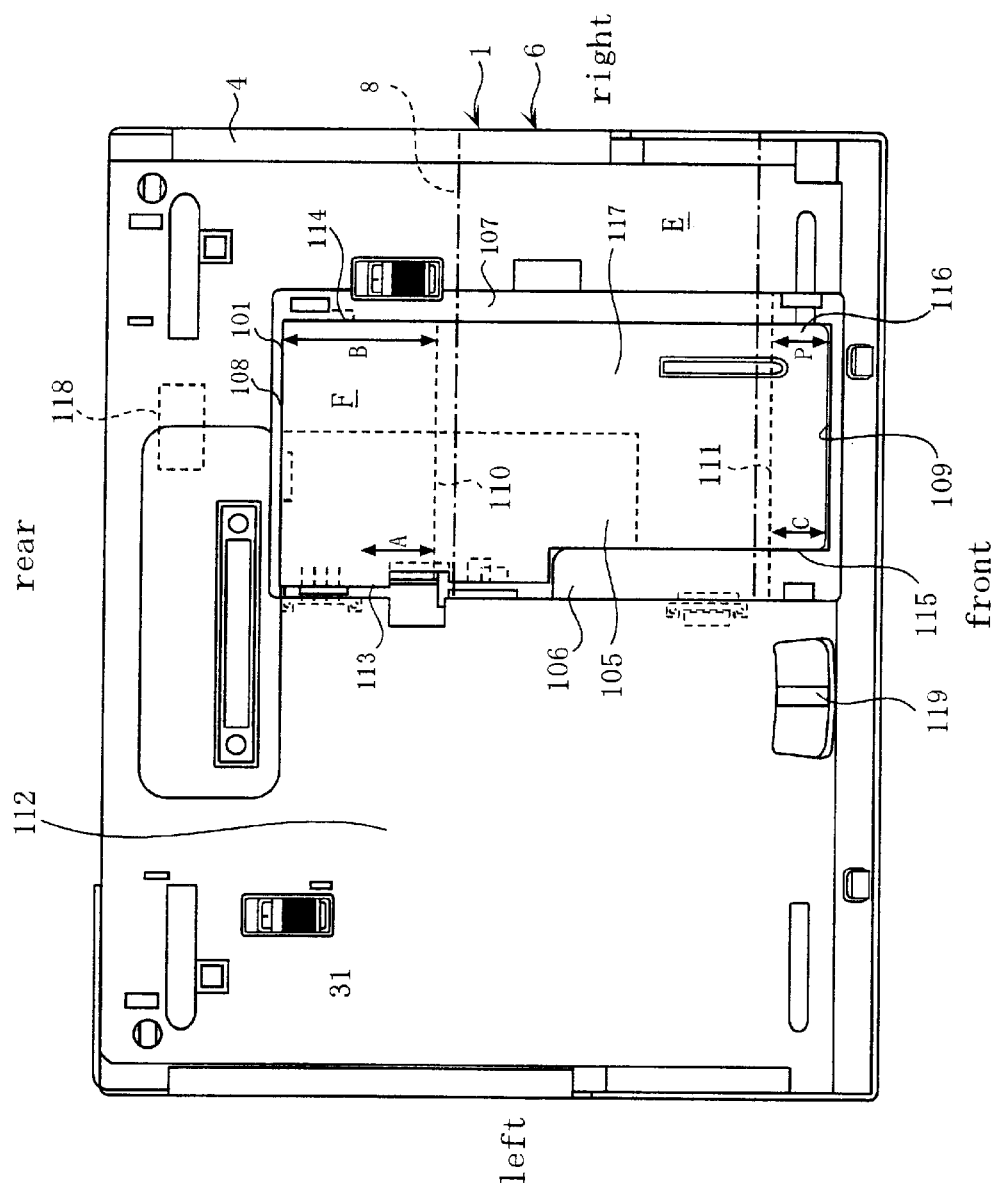
FIG. 15 (a) is a plan view of an accessory for explaining a housing part housing a function expanding member or a driving battery, and FIG. 15 (b) is a cross-sectional view corresponding to FIG. 15 (a).
Figure 15B:
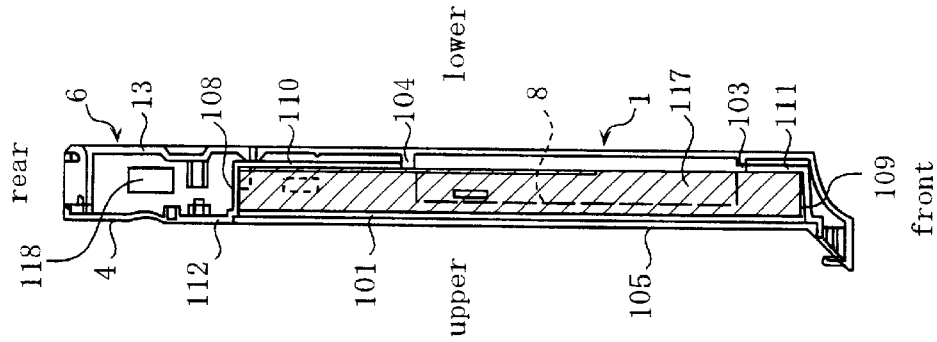

As shown in FIG. 15, a housing part 101 is formed between the mounting part 4 and the base part 13. Although the mechanical equipment 8 can be also housed in the housing part 101 through the opening 7, a driving battery 117 (175 mm in length by 85 mm in width, for example) can be housed in place of the mechanical equipment 8 by opening a cover 102 constituting a part of the mounting part 4.

Projections 103 and 104 projecting upward are formed so as to extend in a right-and-left direction in the base part 13. When the mechanical equipment 8 is housed in the housing part 101, the mechanical equipment 8 is interposed between the recesses 103 and 104 in FIG. 15, the mechanical equipment 8 is indicated by an imaginary line.

An opening 105 appears by detaching the cover 102. Flanges 106 and 107 for receiving the cover 102 are formed in predetermined areas at a peripheral edge of the opening 105. The flanges 106 and 107 are formed so as to be lower than the mounting part 4 by the thickness of the cover 102 so that no step occurs in the mounting part 4 by the cover 102.

A battery housing space (a longwise space F) of the housing part 101 is constituted by a space which is shared with a space housing a rear wall 108, a front wall 109, a rear bottom 110, a front bottom 111, a rear left sidewall (a range indicated by A) 113, a rear right sidewall (a range indicated by B) 114, a front left sidewall (a range indicated by C) 115, a front right sidewall (a range indicated by D) 116, and the mechanical equipment 8. The rear bottom 110 and the front bottom 111 are formed so as to be slightly higher than a bottom surface (the base part 13) of the space housing the mechanical equipment 8. The rear wall 108, the front wall 109, the rear bottom 110, the front bottom 111, the rear left sidewall 113, the rear right sidewall 114, the front left sidewall 115, the front right sidewall 116, the flanges 106 and 107, and a flat portion 112 of the mounting part 4 are integrally formed.

A mechanical equipment housing space (an oblong space E) of the housing part 101 is constituted by a space controlled by the bottom surface of the base part 13 and the recesses 103 and 104.

Either one of the mechanical equipment 8 and the driving battery 117 for the electronic device 5 can be thus arbitrarily housed in the housing part 101. That is, the user can house the mechanical equipment 8 in the housing part 101 when an attempt to expand the function thereof is made, while housing the battery 117 upon detaching the mechanical equipment 8 when an attempt to the battery 117 is made. The battery 117 and the mechanical equipment 8 cannot be simultaneously housed in the housing part 101.

The present invention is not limited to the above-mentioned embodiment. For example, it is possible to house the mechanical equipment 8 in the space F and to house the driving battery 117 in the space E. In other words, the housing part 101 can select a form in which a housed object is supported on the bottoms 110 and 111 formed in the mounting part 4 and a form in which the housed object is supported on the base part 13. The mechanical equipment 8 and the driving battery 117 may be housed in any form. When the housing part 101 is realized only by the shape of the base member or the shape of the mounting part 4, the shape of the base member or the shape of the mounting part 4 becomes complicated. If it is constructed, as described above, the shape cannot be prevented from being complicated, and the space F corresponding to the mechanical equipment 8 and the space E corresponding to the battery 117 can be respectively formed most suitably, thereby making it possible to prevent backlash at the time of the containment.

Although the housing part 101 cannot simultaneously house both the mechanical equipment 8 and the driving battery 117, either one of them can be selectively housed, thereby making it possible to make a space smaller, as compared with that in such construction that both of them are housed. Accordingly, the accessory 1 can be miniaturized. The user is given freedom of selection, as compared with such a dedicated type housing portion that either one of them can be only housed. That is, when an operation of the electronic device whose function is expanded is desired, the containment of the mechanical equipment 8 can be selected. When an attempt to ensure a standby battery for the electronic device 5 is made, it is possible to select the containment of the driving battery 117.

A charging part 118 for charging the driving battery 117 is incorporated into a circuit board (not shown) arranged on the base part 13. The driving battery 117 housed in the housing part 101 is electrically connected to the charging part 118 by a terminal. When the accessory 1 is connected to a commercial power supply (an AC power supply), the charging part 118 charges the battery 117.

When a voltage of the battery housed in the electronic device 5 drops, the electronic device 5 can be directly operated by taking out and replacing the driving battery 117, which is very convenient. Further, the battery whose voltage drops can be housed in the housing part 101 and charged.

The cover 102 may be engaged and the engagement thereof may be released by operating the operating part 30. For example, a hook portion is formed on a reverse surface of the cover 102. A member which is engaged with the hook portion when the operating part 30 is at a front position (a position where the member 8 is engaged) and is detached from the hook portion when the operating part 30 is at a rear position (a position where the engagement of the member 8 is released) may be provided. Consequently, the battery can be also prevented from being stolen.

(Ejecting operation of equipments 8 and 15)

As shown in FIG. 6, a switching operating part 119 is composed of plastic, for example, is positioned approximately intermediate between the mechanical equipment 8 and the mechanical equipment 15, and is arranged so as to be operable from an opening formed in the mounting part 4. A lever 120 is composed of a metal plate, for example, and the switching operating part 119 is fixed to its front end. The lever 120 is horizontally rotated by supporting its rear end on a shaft 121. Accordingly, the user can operate the switching operating part 119 in a G direction (rightward and leftward).

An intermediate position of the lever 120 is provided with a projection 122 projecting toward its reverse surface. When the switching operating part 119 is at a central position H of the opening, a right side surface of the projection 122 is abutted against a rear end surface of the mechanical equipment 8, and a left side surface of the projection 122 is abutted against a rear end surface of the mechanical equipment 15. In this state, both the mechanical equipments 8 and 15 are in completely housed states.

Figure 16:
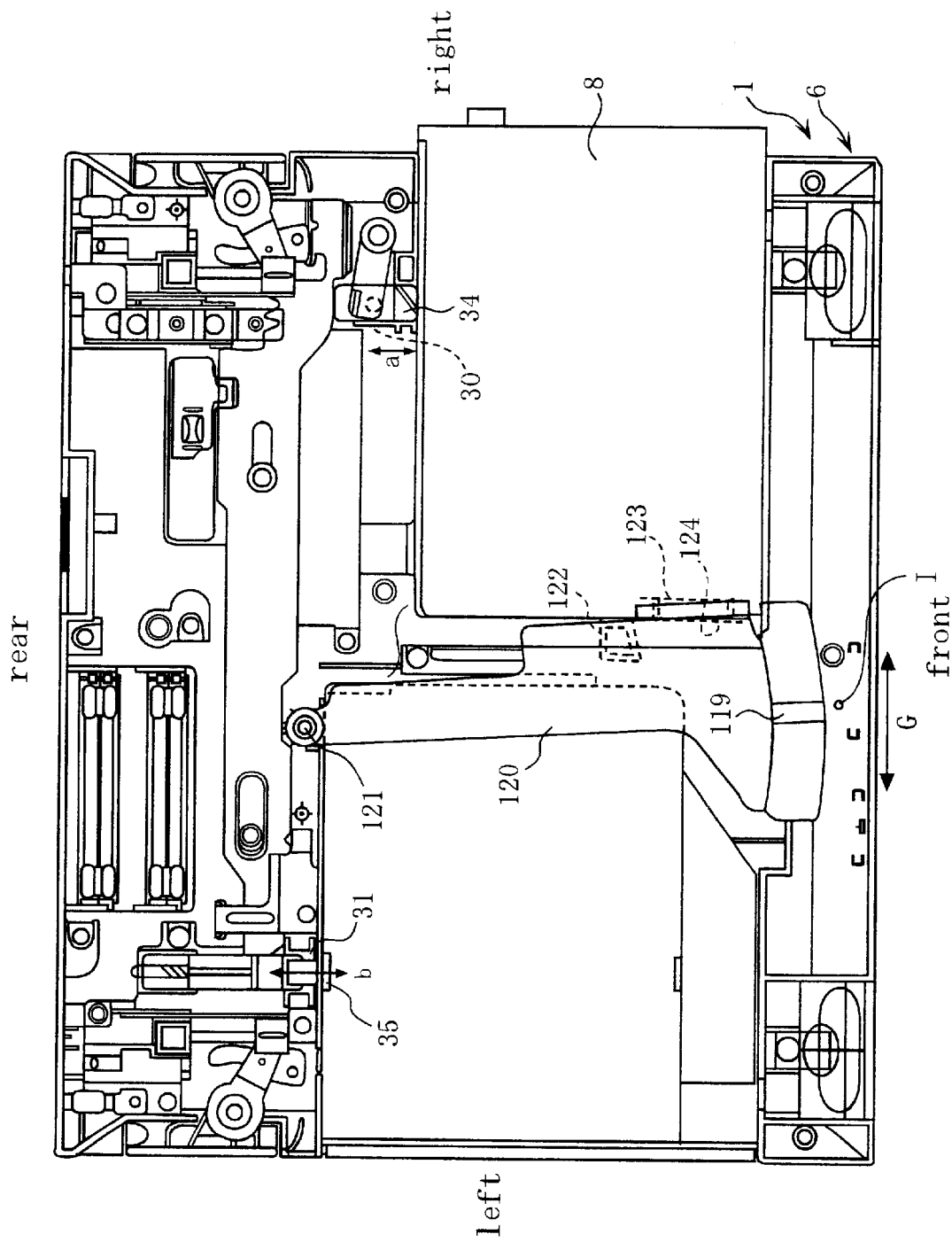
FIG. 16 is a plan view of an accessory for explaining a mechanism for taking out a member housed in a housing part.

When the mechanical equipment 8 is detached, the operating part 30 is operated to move the engaging part 34 backward, thereby releasing the engaged state of the mechanical equipment 8 by the engaging part 34. When the switching operating part 119 is moved rightward to a right position I, as shown in FIG. 16, in this released state, the lever 120 is rotated in a counterclockwise direction, and the mechanical equipment 8 is ejected rightward upon being pressed against the right side surface of the projection 122. At this time, a male connector 123 provided at the rear end of the mechanical equipment 8 is detached from a female connector 134 provided in the base 6. The mechanical equipment 8 is thus ejected. A front right edge of the lever 120 (a part corresponding to the position of the connector) may be formed so as to contribute to the ejection of the mechanical equipment 8.

Figure 17:
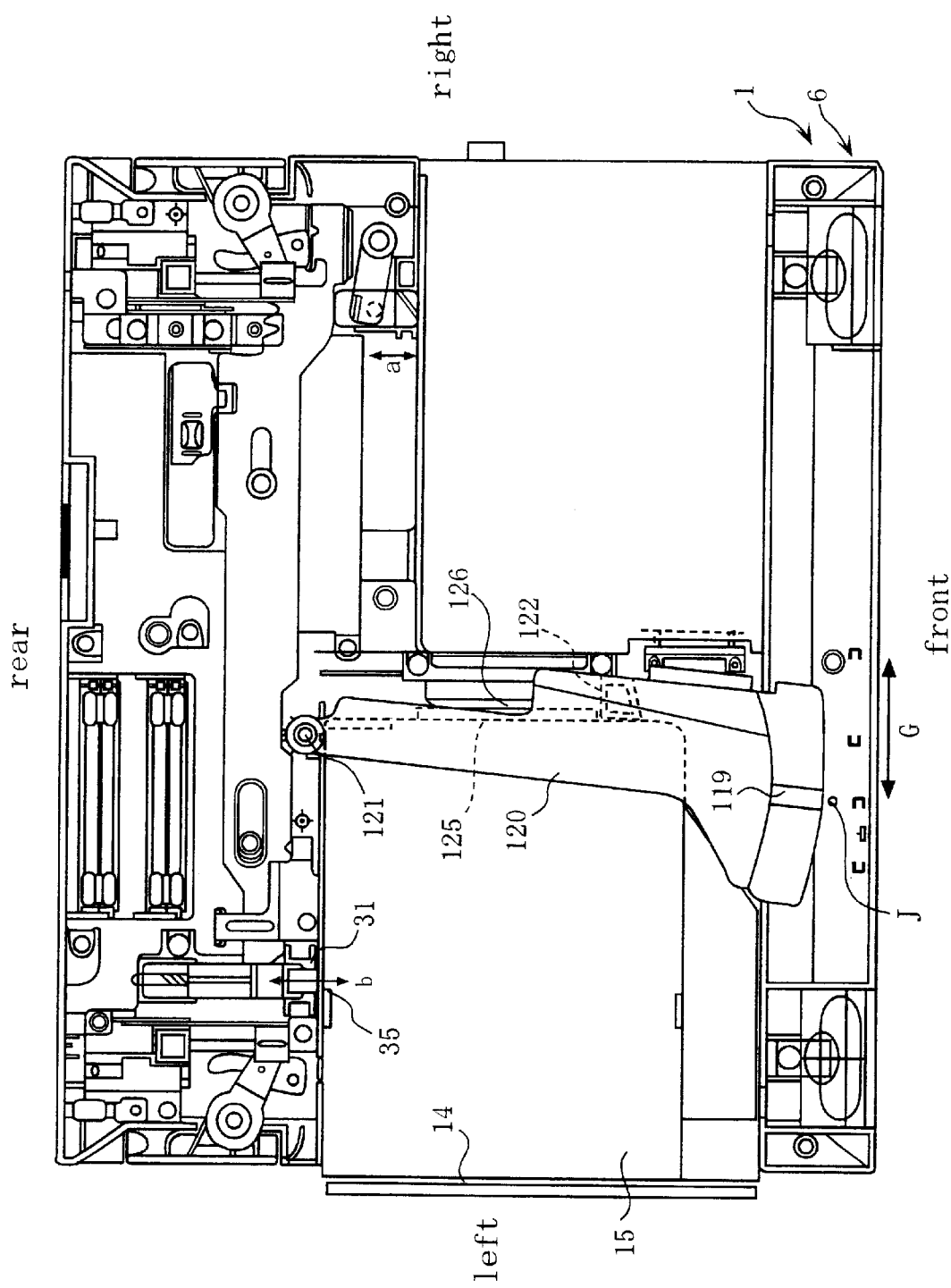
FIG. 17 is a plan view of an accessory for explaining a mechanism for taking out a member housed in a housing part.

When the mechanical equipment 15 is taken out, the operating part 31 is operated to move the engaging part 35 backward, thereby releasing the engaged state of the mechanical equipment 15 by the engaging part 35, as shown in FIG. 17. When the switching operating part 119 is moved leftward to a left position J in the released state, the lever 120 is rotated in a clockwise direction, and the mechanical equipment 15 is ejected leftward upon being pressed against the left side surface of the projection 122. At this time, a female connector 125 provided at the rear end of the mechanical equipment 15 is detached from a male connector 126 provided in the base 6. The mechanical equipment 8 is thus ejected.

In the accessory 1, the electronic device 5 can be thus placed on the mounting part 4 in the base 6, and the mechanical equipments 8 and 15 can be housed in the base 6. The mechanical equipments 8 and 15 can be ejected by operating the switching operating part 119. Since the mechanical equipments 8 and 15 are ejected in the one switching operating part 119, the number of parts is small, thereby making it possible to reduce the cost. Further, the mechanical equipments 8 and 15 are ejected by rotating the lever 120 in a clockwise direction and in a counterclockwise direction. Accordingly, an ejecting force can be exerted on a position suitable for each of the mechanical equipments, and the degree of freedom of the position where the switching operating part 19 is arranged is increased.

INDUSTRIAL APPLICABILITY

As described in the foregoing, an accessory of an electronic device according to the present invention is effective as one for expanding the function of the electronic device or the like as well as capable of preventing the electronic device from being stolen while improving the operability in attachment and detachment of the electronic device.

What is claimed is:

1. An accessory of an electronic device characterized by comprising a base having a mounting part on which the electronic device is placed and a housing part housing a member, a hook provided in the base so as to be movable between an engaging position where the electronic device is to be engaged and a releasing position where the engagement is to be released, an operation lever provided in the base in order to operate the hook, an engaging part provided in the base so as to be movable between an engaging position where a member housed in the housing part is to be engaged and a releasing position where the engagement is to be released, an operating part provided in the base in order to operate the engaging part, and a locking part provided so as to be attachable and detachable to and from the base, and being so constructed that the locking part cannot be detached from the base when the locking part is attached to the base to achieve locking, the movement of the hook to the releasing position is limited, and the movement of the engaging part to the releasing position is limited.

2. The accessory of the electronic device according to claim 1, characterized by comprising a control plate provided in the base so as to be movable to a plurality of positions, and a movement operating part for operating the movement of the control plate, and being so constructed that when the locking part is attached to the base to achieve locking in a state where the control plate is positioned at a first position, the locking part cannot be detached from the base, so that the movement of the hook to the releasing position is limited, the movement of the engaging part to the releasing position is limited, and the movement of the control plate from the first position to another position is limited.

3. The accessory of the electronic device according to claim 1, characterized by being so constructed that an ejecting part for ejecting the electronic device is provided in the base, and the engagement of the electronic device by the hook is released, and the ejecting part ejects the electronic device when the operation lever is operated.

4. An accessory of the electronic device comprising:
a base having a mounting part on which the electronic device is placed and a housing part housing a member, a hook provided in the base so as to be movable between an engaging position where the electronic device is to be engaged and a releasing position where the engagement is to be released, an operation lever provided in the base in order to operate the hook, an engaging part provided in the base so as to be movable between an engaging position where the member housed in the housing part is to be engaged and a releasing position where the engagement is to be released, an operating part provided in the base in order to operate the engaging part, a locking part provided so as to be attachable and detachable to and from the base, a control plate provided in the base so as to be movable to a plurality of positions, and a movement operating part for operating the movement of the control plate, and being so constructed that when the locking part is attached to the base to achieve locking in a state where the control plate is positioned at a second position, the locking part cannot be detached from the base, so that the movement of the hook to the releasing position is allowed, the movement of the engaging part to the releasing position is allowed, and the movement of the control plate from the second position to another position is limited.

5. An accessory of the electronic device comprising:
a base having a mounting part on which the electronic device is placed and a housing part housing a member, a hook provided in the base so as to be movable between an engaging position where the electronic device is to be engaged and a releasing position where the engagement is to be released, an operation lever provided in the base in order to operate the hook, an engaging part provided in the base so as to be movable between an engaging position where the member housed in the housing part is to be engaged and a releasing position where the engagement is to be released, an operating part provided in the base in order to operate the engaging part, a locking part provided so as to be attachable and detachable to and from the base, a control plate provided in the base so as to be movable to a plurality of positions, and a movement operating part for operating the movement of the control plate, and being so constructed that when the locking part is attached to the base to achieve locking in a state where the control plate is positioned at a third position, the locking part cannot be detached from the base, so that the movement of the hook to the releasing position is allowed, the movement of the engaging part to the releasing position is limited, and the movement of the control plate from the third position to another position is limited.

6. An accessory of the electronic device as in any one of claims 2, 4 or 5, in which the moving operating part is provided on a reverse surface of the base.

7. The accessory of the electronic device comprising:
a base having a mounting part on which the electronic device is placed, a base part arranged below the mounting part, and a housing part housing a member, wherein the housing part is formed in a cross-like shape, a housing space being interposed between the base part and the mounting part, the housing space being formed by the difference between steps formed in the mounting part, and one of the function expanding member for the electronic device and the driving battery for the electronic device is arbitrarily housed in either one of the housing spaces.

8. An accessory of an electronic device, comprising:

a base having a mounting part on which the electronic device is placed, a base part arranged below the mounting part, and a housing part housing a member, and being so constructed that either one of a function expanding member for the electronic device and a driving battery for the electronic device is arbitrarily housed as the member in the housing part, wherein there is provided a charging part for charging the housed driving battery.

9. An accessory of an electronic device, characterized by comprising a base having a mounting part on which the electronic device is placed, a first housing part housing a first member, and a second housing part housing a second member, and a switching operating part provided in the base, and being so constructed that the first member or the second member is ejected in response to an operation of the switching operating part.

10. The accessory of the electronic device according to claim 9, characterized by being so constructed that a lever having its one end pivoted and having the other end fixed to the switching operating part is provided in the base so as to be positioned between the first housing part and the second housing part, the first member which is abutted against the lever is ejected from the first housing part when the lever is rotated in a first direction by operating the switching operating part, and a second member which is abutted against the lever is ejected from the second housing part when the lever is rotated in a second direction.

11. An accessory of an electronic device comprising:

a base having a mounting part on which the electronic device is placed and a housing part housing a member, a first projection and a second projection which are provided in the base so as to be respectively inserted into a first hole and a second hole which are formed in the electronic device, and a second connecting terminal provided in the base so as to be inserted into a first connecting terminal provided in the electronic device, wherein both the first projection and the second connecting terminal are provided almost perpendicularly, and the second projection is provided almost horizontally.

12. An accessory of an electronic device comprising:

a base having a mounting part on which the electronic device is placed and a housing part housing a member, a first projection and a second projection which are provided in the base so as to be respectively inserted into a first hole and a second hole which are formed in the electronic device, and a second connecting terminal provided in the base so as to be inserted into a first connecting terminal provided in the electronic device, wherein a first conductive part is provided on a reverse surface of the second projection, to electrically ground a first circuit board provided in the electronic device and a second circuit board provided in the base through the first conductive part.

13. The accessory of the electronic device according to claim 12, characterized in that a second flexible conductive part having its one end electrically connected to the first circuit board in the electronic device and the other end arranged so as to face the second hole is interposed between the first conductive part and an edge of the second hole when the electronic device is attached to the mounting part.

* * * * *